United States Patent
Laitinen et al.

(10) Patent No.: US 12,156,014 B2
(45) Date of Patent: Nov. 26, 2024

(54) DIRECTION ESTIMATION ENHANCEMENT FOR PARAMETRIC SPATIAL AUDIO CAPTURE USING BROADBAND ESTIMATES

(71) Applicant: NOKIA TECHNOLOGIES OY, Espoo (FI)

(72) Inventors: Mikko-Ville Laitinen, Espoo (FI); Antti Eronen, Tampere (FI); Juha Vilkamo, Helsinki (FI); Tapani Pihlajakuja, Vantaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 93 days.

(21) Appl. No.: 17/638,377

(22) PCT Filed: Sep. 2, 2020

(86) PCT No.: PCT/FI2020/050566
§ 371 (c)(1),
(2) Date: Feb. 25, 2022

(87) PCT Pub. No.: WO2021/053264
PCT Pub. Date: Mar. 25, 2021

(65) Prior Publication Data
US 2022/0303711 A1   Sep. 22, 2022

(30) Foreign Application Priority Data
Sep. 17, 2019 (GB) .................................... 1913405

(51) Int. Cl.
*H04S 7/00* (2006.01)
*G06T 7/70* (2017.01)
(Continued)

(52) U.S. Cl.
CPC ................ *H04S 7/304* (2013.01); *G06T 7/70* (2017.01); *G06V 40/161* (2022.01); *G06V 40/20* (2022.01);
(Continued)

(58) Field of Classification Search
None
See application file for complete search history.

(56) References Cited

U.S. PATENT DOCUMENTS

2008/0232601 A1   9/2008  Pulkki
2009/0116652 A1   5/2009  Kirkeby et al.
(Continued)

FOREIGN PATENT DOCUMENTS

CN   101658052 A   2/2010
CN   107113528 A   8/2017
(Continued)

OTHER PUBLICATIONS

Redmon et al., "You Only Look Once: Unified, Real-Time Object Detection", arXiv:1506.02640v5, (May 6, 2016), 10 pages.
(Continued)

*Primary Examiner* — Kenny H Truong
(74) *Attorney, Agent, or Firm* — ALSTON & BIRD LLP

(57) ABSTRACT

An apparatus (303) comprising means configured to: obtain at least one audio signal (112); determine at least one direction parameter (506) of at least one propagating sound associated with the at least one audio signal (112); determine at least one direction (302) of at least one sound source associated with the at least one audio signal (112); modify the at least one direction parameter (506) in accordance with the determined at least one direction (302); and output the modified at least one direction parameter (508).

17 Claims, 12 Drawing Sheets

(51) Int. Cl.
*G06V 40/16* (2022.01)
*G06V 40/20* (2022.01)

(52) U.S. Cl.
CPC . *G06T 2207/30201* (2013.01); *H04S 2400/11* (2013.01); *H04S 2400/15* (2013.01)

(56) References Cited

U.S. PATENT DOCUMENTS

| | | |
|---|---|---|
| 2013/0016842 A1* | 1/2013 | Schultz-Amling .... H04N 5/782 381/17 |
| 2013/0230187 A1 | 9/2013 | Kuech et al. |
| 2016/0198282 A1 | 7/2016 | Kim et al. |
| 2017/0084287 A1 | 3/2017 | Kim et al. |
| 2018/0020285 A1* | 1/2018 | Zass .................... G10L 21/0224 |
| 2018/0295463 A1 | 10/2018 | Eronen et al. |
| 2018/0332385 A1 | 11/2018 | Takahashi et al. |
| 2019/0104375 A1 | 4/2019 | Laaksonen |

FOREIGN PATENT DOCUMENTS

| | | |
|---|---|---|
| CN | 108028982 A | 5/2018 |
| CN | 108293161 A | 7/2018 |
| CN | 108369811 A | 8/2018 |
| EP | 2824663 A2 | 1/2015 |
| EP | 3252491 A1 | 12/2017 |
| EP | 3264734 A1 | 1/2018 |
| EP | 3470975 A1 | 4/2019 |
| EP | 3542546 A1 | 9/2019 |
| GB | 2572368 | 10/2019 |
| WO | WO 2012/066183 A1 | 5/2012 |
| WO | WO 2013/024200 A1 | 2/2013 |
| WO | WO 2014/080074 A1 | 5/2014 |
| WO | WO 2017/005975 A1 | 1/2017 |
| WO | WO 2017/005978 A1 | 1/2017 |
| WO | WO 2018/162803 A1 | 9/2018 |
| WO | WO 2018/234624 A1 | 12/2018 |
| WO | WO 2018/234625 A1 | 12/2018 |
| WO | WO 2019/012133 A1 | 1/2019 |
| WO | WO 2019/068638 A1 | 4/2019 |

OTHER PUBLICATIONS

Khaddour et al., "A Novel Combined System of Direction Estimation and Sound Zooming of Multiple Speakers", Radioengineering vol. 27, No. 2, (Jun. 2015), pp. 583-592.

Politis et al., "Parametric Spatial Audio Effects", Proceedings of the 15th International Conference on Digital Audio Effects (DAFx-12), (Sep. 17-21, 2012), 8 pages.

International Search Report and Written Opinion for Patent Cooperation Treaty Application No. PCT/FI2020/050566 dated Dec. 8, 2020, 15 pages.

Search Report for United Kingdom Application No. GB1913405.5 dated Mar. 10, 2020, 3 pages.

Pavlidi et al., "Real-Time Multiple Sound Source Localization and Counting Using a Circular Microphone Array", IEEE Transactions on Audio, Speech, and Language Processing, vol. 21, Issue 10, (Oct. 2013), 14 pages.

Office Action for Chinese Application No. 202080064936.4 dated Jun. 28, 2024, 11 pages.

* cited by examiner

DIRECTION ESTIMATION ENHANCEMENT FOR PARAMETRIC SPATIAL AUDIO CAPTURE USING BROADBAND ESTIMATES

CROSS-REFERENCE TO RELATED APPLICATIONS

This application is a national phase entry of International Application No. PCT/FI2020/050566, filed Sep. 2, 2020, which claims priority to Great Britain Application No. 1913405.5, filed Sep. 17, 2019, the entire contents of which are incorporated herein by reference.

FIELD

The present application relates to apparatus and methods for direction estimation enhancement for parametric spatial audio capture using broadband estimates.

BACKGROUND

The capture or recording of spatial sound using microphone arrays, such as the ones in consumer mobile devices (such as the Nokia 8) and commercial recording devices (such as the Nokia OZO) is known. This spatial sound may be reproduced for headphones or multichannel loudspeaker setups and provide a rich audio experience. The audio signals captured by the devices may be reproduced in a suitable output format within the same device, or at another device. For example, after transmission as audio channels and spatial metadata or as Ambisonic signals to a suitable playback or receiver device.

For transmission, the audio signals or channels can be compressed, for example, using advanced audio coding (AAC) or MPEG-H 3D audio compression or other suitable compression mechanism. The spatial metadata can also be compressed and either transmitted in the same data packet as the audio data or as a separate compressed metadata stream. In the case where the audio signals or channels and the associated metadata are compressed for transmission, they are decoded before reproduction.

Mobile devices which may comprise microphone arrays, may utilize parametric spatial audio capture and rendering methods to enable perceptually accurate spatial sound reproduction. Parametric spatial audio capture refers to adaptive DSP-driven audio capture methods. Specifically, parametric spatial audio methods can be typically summarized as the following operations:

1) analysing perceptually relevant parameters in frequency bands and in short temporal intervals (often referred as time-frequency slots), for example, the direction-of-arrival of the propagating sound at the recording position, and 2) reproducing spatial sound in a perceptual sense at the rendering side according to the estimated spatial parameters.

The reproduction can be, for example, for headphones or multichannel loudspeaker setups. By estimating and reproducing the perceptually relevant spatial properties (parameters) of the sound field, a spatial perception similar to that which would occur if the listener was listening to the original sound field can be produced. As a result, a listener can perceive the multitude of sources, their directions and distances, as well as properties of the surrounding physical space, among the other spatial sound features, as if the listener was in the position of the capture device.

Binaural spatial-audio-reproduction methods (such as described in PCT published patents WO2018/091776, WO2018/060549, US20130044884, WO2017/005978, EP3320699) called spatial audio capture (SPAC) processes captured microphone-array signals (e.g., from Nokia 8 or Nokia OZO) are known. These processes estimate the directions of arrival (DOA) and the relative energies of the direct and ambient components, expressed as direct-to-total energy ratios, from the microphone signals in frequency bands, and synthesizes for example binaural signals for headphone listening or multi-channel loudspeaker signals for loudspeaker listening, or Ambisonic outputs for YouTube 360 and similar services.

Although SPAC typically produces good audio quality, the spatial analysis accuracy may be suboptimal because of various reasons. Potential reasons for example can be irregularities in the circumstances of the capture device (for example where a mobile device is held in hand in different ways or covered with a protection case), wind noise, there being a necessity to use AAC encoding of the audio signals before the spatial analysis (which may produce a poorer quality analysis), and acoustic ambience in the sound field itself. However AAC encoding is only an example of lossy coding that can cause problems with spatial analysis. Any other lossy codec can also cause these problems (e.g., mp3, Ogg Vorbis, etc.)

SUMMARY

There is provided according to a first aspect an apparatus comprising means configured to: obtain at least one audio signal; determine at least one direction parameter of at least one propagating sound associated with the at least one audio signal; determine at least one direction of at least one sound source associated with the at least one audio signal; modify the at least one direction parameter in accordance with the determined at least one direction; and output the modified at least one direction parameter.

The means configured to obtain at least one audio signal may be configured to obtain at least one of: at least two microphone audio signals; at least one ambisonic audio signal; at least one spatial audio signal, wherein the at least one spatial audio signal is associated with at least one metadata parameter, wherein the at least one metadata parameter comprises at least one of: a direction or direction-of-arrival; an energy ratio; a diffuseness ratio.

The means configured to determine at least one direction parameter of at least one propagating sound is configured to determine at least one of: at least one direction parameter of at least one propagating sound; at least one direction parameter of at least one audio source; at least one direction parameter of at least one reflection from at least one audio source; and at least one energy ratio parameter associated with the at least one direction parameter.

The means configured to determine at least one direction parameter of at least one propagating sound may be configured to determine the at least one direction parameter associated with at least one frequency band of the at least one audio signal.

The at least one propagating sound associated with the at least one audio signal may comprise at least one of: a direct sound associated with at least one audio source within a space; a reflected sound associated with at least one audio source within a space; a sound associated with at least one virtual source; a reverberation sound; an ambient sound; and a superposition of any of the direct sound, reflected sound, reverberation sound and ambient sound.

The at least one propagating sound associated with the at least one audio signal may be relative to a recording position from which the at least one audio signal is captured.

The means configured to determine at least one direction of at least one sound source associated with the at least one audio signal may be configured to: obtain at least one image; analyse the at least one image to determine within the image at least one object of interest; and determine based on a location of the at least one object of interest within the at least one image and image capture parameters the at least one direction of at least one sound source.

The means configured to analyse the at least one image to determine within the image at least one object of interest may be configured to identify at least one talker, based on identifying a face from the at least one image and further based on identifying motion of lips within the face between images.

The means configured to determine the at least one direction of at least one sound source may be configured to perform at least one of: analyse at least one signal from at least one infra-red sensor to determine the at least one direction of at least one sound source; analyse at least one signal from at least one sensor to determine the at least one direction of at least one sound source; obtain at least one user-input signal identifying the at least one direction of at least one sound source; obtain at least one positioning signal associated with an object, from which the at least one direction of at least one sound source is determined; analyse the at least one audio signal, when the at least one audio signal comprises two or more microphone audio signals; and obtain metadata associated with the at least one audio signal, the metadata comprising directional or location information, from which the at least one direction of at least one sound source is determined when the at least one direction parameter of at least one propagating sound is determined from an analysis of the at least one audio signal.

The means configured to modify the at least one direction parameter in accordance with the determined at least one direction may be configured to: determine an angular difference between the at least one direction parameter and the at least one direction of at least one sound source; compare the angular difference against a threshold value, wherein where the angular difference is larger than the threshold value then the at least one direction parameter is passed unmodified but where the angular difference is smaller than the threshold value then the at least one direction parameter is modified towards the at least one direction of the at least one sound source.

The means configured to modify the direction parameter towards the at least one direction of the at least one sound source may be configured to modify the direction parameter to be at the at least one direction of the at least one sound source when the angular difference is less than a determined smaller threshold value and apply an interpolated modification to the direction parameter when the angular difference is more than the determined smaller threshold value but less than the threshold value.

The means may be further configured to: determine at least one transport audio signal based on the at least one audio signal; and output the at least one transport audio signal with the modified direction parameter.

The means may be further configured to: analyse the at least one audio signal, when the at least one audio signal comprises at least two microphone audio signals, to determine at least one metadata parameter, wherein the at least one metadata parameter may comprise at least one of: an energy ratio; and a diffuseness ratio; output the at least one metadata parameter with the modified direction parameter.

According to a second aspect there is provided an apparatus comprising means configured to: obtain at least one transport audio signal; determine at least one direction parameter of at least one propagating sound associated with the at least one transport audio signal; determine at least one direction of at least one sound source associated with the at least one transport audio signal; modify the at least one direction parameter in accordance with the determined at least one direction; and output the modified at least one direction parameter.

The means configured to obtain at least one transport audio signal may be configured to receive at least one of: at least two microphone audio signals; at least one ambisonic audio signal; at least one spatial audio signal, wherein the at least one spatial audio signal is associated with at least one metadata parameter, wherein the at least one metadata parameter comprises at least one of: a direction or direction-of-arrival; an energy ratio; a diffuseness ratio.

The means configured to determine at least one direction parameter of at least one propagating sound may be configured to determine at least one of: at least one direction parameter of at least one propagating sound; at least one direction parameter of at least one audio source; at least one direction parameter of at least one reflection from at least one audio source; and at least one energy ratio parameter associated with the at least one direction parameter.

The means configured to determine at least one direction parameter of at least one propagating sound may be configured to determine the at least one direction parameter associated with at least one frequency band of the at least one transport audio signal.

The at least one propagating sound associated with the at least one audio signal may comprise at least one of: a direct sound associated with at least one audio source within a space; a reflected sound associated with at least one audio source within a space; a sound associated with at least one virtual source; a reverberation sound; an ambient sound; a superposition of any of the direct sound, reflected sound, reverberation sound and ambient sound.

The at least one propagating sound associated with the at least one transport audio signal may be relative to a recording position from which at least one audio signal, from which the at least one transport audio signal is generated, is captured.

The means configured to determine at least one direction of at least one sound source associated with the at least one transport audio signal may be configured to: obtain at least one image; analyse the at least one image to determine within the image at least one object of interest; and determine based on a location of the at least one object of interest within the at least one image and image capture parameters the at least one direction of at least one sound source.

The means configured to analyse the at least one image to determine within the image at least one object of interest may be configured to identify at least one talker, based on identifying a face from the at least one image and further based on identifying motion of lips within the face between images.

The means configured to determine the at least one direction of at least one sound source may be configured to perform at least one of: analyse at least one signal from at least one infra-red sensor to determine the at least one direction of at least one sound source; analyse at least one signal from at least one sensor to determine the at least one direction of at least one sound source; obtain at least one user-input signal identifying the at least one direction of at least one sound source; obtain at least one positioning signal associated with an object, from which the at least one direction of at least one sound source is determined; analyse the at least one transport audio signal, when the at least one transport audio signal comprises two or more microphone audio signals; and obtain metadata associated with the at least one audio signal, the metadata comprising directional or location information, from which the at least one direction of at least one sound source is determined when the at least one direction parameter of at least one propagating sound is determined from an analysis of the at least one transport audio signal.

The means configured to modify the at least one direction parameter in accordance with the determined at least one direction may be configured to: determine an angular difference between the at least one direction parameter and the at least one direction of at least one sound source; compare the angular difference against a threshold value, wherein where the angular difference is larger than the threshold value then the at least one direction parameter is passed unmodified but where the angular difference is smaller than the threshold value then the at least one direction parameter is modified towards the at least one direction of the at least one sound source.

The means configured to modify the direction parameter towards the at least one direction of the at least one sound source may be configured to modify the direction parameter to be at the at least one direction of the at least one sound source when the angular difference is less than a determined smaller threshold value and apply an interpolated modification to the direction parameter when the angular difference is more than the determined smaller threshold value but less than the threshold value.

According to a third aspect there is provided a method comprising: obtaining at least one audio signal; determining at least one direction parameter of at least one propagating sound associated with the at least one audio signal; determining at least one direction of at least one sound source associated with the at least one audio signal; modifying the at least one direction parameter in accordance with the determined at least one direction; and outputting the modified at least one direction parameter.

Obtaining at least one audio signal may comprise obtaining at least one of: at least two microphone audio signals; at least one ambisonic audio signal; at least one spatial audio signal, wherein the at least one spatial audio signal is associated with at least one metadata parameter, wherein the at least one metadata parameter comprises at least one of: a direction or direction-of-arrival; an energy ratio; a diffuseness ratio.

Determining at least one direction parameter of at least one propagating sound may comprise determining at least one of: at least one direction parameter of at least one propagating sound; at least one direction parameter of at least one audio source; at least one direction parameter of at least one reflection from at least one audio source; and at least one energy ratio parameter associated with the at least one direction parameter.

Determining at least one direction parameter of at least one propagating sound may comprise determining the at least one direction parameter associated with at least one frequency band of the at least one audio signal.

The at least one propagating sound associated with the at least one audio signal may comprise at least one of: a direct sound associated with at least one audio source within a space; a reflected sound associated with at least one audio source within a space; a sound associated with at least one virtual source; a reverberation sound; an ambient sound; and a superposition of any of the direct sound, reflected sound, reverberation sound and ambient sound.

The at least one propagating sound associated with the at least one audio signal may be relative to a recording position from which the at least one audio signal is captured.

Determining at least one direction of at least one sound source associated with the at least one audio signal may comprise: obtaining at least one image; analyse the at least one image to determine within the image at least one object of interest; and determining based on a location of the at least one object of interest within the at least one image and image capture parameters the at least one direction of at least one sound source.

Analysing the at least one image to determine within the image at least one object of interest may comprise identifying at least one talker, based on identifying a face from the at least one image and further based on identifying motion of lips within the face between images.

Determining the at least one direction of at least one sound source may comprise performing at least one of: analysing at least one signal from at least one infra-red sensor to determine the at least one direction of at least one sound source; analysing at least one signal from at least one sensor to determine the at least one direction of at least one sound source; obtain at least one user-input signal identifying the at least one direction of at least one sound source; obtaining at least one positioning signal associated with an object, from which the at least one direction of at least one sound source is determined; analysing the at least one audio signal, when the at least one audio signal comprises two or more microphone audio signals; and obtaining metadata associated with the at least one audio signal, the metadata comprising directional or location information, from which the at least one direction of at least one sound source is determined when the at least one direction parameter of at least one propagating sound is determined from an analysis of the at least one audio signal.

Modifying the at least one direction parameter in accordance with the determined at least one direction may comprise: determining an angular difference between the at least one direction parameter and the at least one direction of at least one sound source; comparing the angular difference against a threshold value, wherein where the angular difference is larger than the threshold value then the at least one direction parameter is passed unmodified but where the angular difference is smaller than the threshold value then the at least one direction parameter is modified towards the at least one direction of the at least one sound source.

Modifying the direction parameter towards the at least one direction of the at least one sound source may comprise modifying the direction parameter to be at the at least one direction of the at least one sound source when the angular difference is less than a determined smaller threshold value and apply an interpolated modification to the direction parameter when the angular difference is more than the determined smaller threshold value but less than the threshold value.

The method may further comprise: determining at least one transport audio signal based on the at least one audio signal; and outputting the at least one transport audio signal with the modified direction parameter.

The method may further comprise: analysing the at least one audio signal, when the at least one audio signal comprises at least two microphone audio signals, to determine at least one metadata parameter, wherein the at least one metadata parameter may comprise at least one of: an energy ratio; and a diffuseness ratio; outputting the at least one metadata parameter with the modified direction parameter.

According to a fourth aspect there is provided a method comprising: obtaining at least one transport audio signal; determining at least one direction parameter of at least one propagating sound associated with the at least one transport audio signal; determining at least one direction of at least one sound source associated with the at least one transport audio signal; modifying the at least one direction parameter in accordance with the determined at least one direction; and outputting the modified at least one direction parameter.

Obtaining at least one transport audio signal may comprise receiving at least one of: at least two microphone audio signals; at least one ambisonic audio signal; at least one spatial audio signal, wherein the at least one spatial audio signal is associated with at least one metadata parameter, wherein the at least one metadata parameter comprises at least one of: a direction or direction-of-arrival; an energy ratio; a diffuseness ratio.

Determining at least one direction parameter of at least one propagating sound may comprise determining at least one of: at least one direction parameter of at least one propagating sound; at least one direction parameter of at least one audio source; at least one direction parameter of at least one reflection from at least one audio source; and at least one energy ratio parameter associated with the at least one direction parameter.

Determining at least one direction parameter of at least one propagating sound may comprise determining the at least one direction parameter associated with at least one frequency band of the at least one transport audio signal.

The at least one propagating sound associated with the at least one transport audio signal may comprise at least one of: a direct sound associated with at least one audio source within a space; a reflected sound associated with at least one audio source within a space; a sound associated with at least one virtual source; a reverberation sound; an ambient sound; a superposition of any of the direct sound, reflected sound, reverberation sound and ambient sound.

The at least one propagating sound associated with the at least one transport audio signal may be relative to a recording position from which at least one audio signal, from which the at least one transport audio signal is generated, is captured.

Determining at least one direction of at least one sound source associated with the at least one transport audio signal may comprise: obtaining at least one image; analysing the at least one image to determine within the image at least one object of interest; and determining based on a location of the at least one object of interest within the at least one image and image capture parameters the at least one direction of at least one sound source.

Analysing the at least one image to determine within the image at least one object of interest may comprise identifying at least one talker, based on identifying a face from the at least one image and further based on identifying motion of lips within the face between images.

Determining the at least one direction of at least one sound source may comprise performing at least one of: analyse at least one signal from at least one infra-red sensor to determine the at least one direction of at least one sound source; analysing at least one signal from at least one sensor to determine the at least one direction of at least one sound source; obtaining at least one user-input signal identifying the at least one direction of at least one sound source; obtaining at least one positioning signal associated with an object, from which the at least one direction of at least one sound source is determined; analysing the at least one transport audio signal, when the at least one transport audio signal comprises two or more microphone audio signals; and obtaining metadata associated with the at least one audio signal, the metadata comprising directional or location information, from which the at least one direction of at least one sound source is determined when the at least one direction parameter of at least one propagating sound is determined from an analysis of the at least one transport audio signal.

Modifying the at least one direction parameter in accordance with the determined at least one direction may comprise: determining an angular difference between the at least one direction parameter and the at least one direction of at least one sound source; comparing the angular difference against a threshold value, wherein where the angular difference is larger than the threshold value then the at least one direction parameter is passed unmodified but where the angular difference is smaller than the threshold value then the at least one direction parameter is modified towards the at least one direction of the at least one sound source.

Modifying the direction parameter towards the at least one direction of the at least one sound source may comprise modifying the direction parameter to be at the at least one direction of the at least one sound source when the angular difference is less than a determined smaller threshold value and apply an interpolated modification to the direction parameter when the angular difference is more than the determined smaller threshold value but less than the threshold value. According to a fifth aspect there is provided an apparatus comprising at least one processor and at least one memory including a computer program code, the at least one memory and the computer program code configured to, with the at least one processor, cause the apparatus at least to: obtain at least one audio signal; determine at least one direction parameter of at least one propagating sound associated with the at least one audio signal; determine at least one direction of at least one sound source associated with the at least one audio signal; modify the at least one direction parameter in accordance with the determined at least one direction; and output the modified at least one direction parameter.

The apparatus caused to obtain at least one audio signal may be caused to obtain at least one of: at least two microphone audio signals; at least one ambisonic audio signal; at least one spatial audio signal, wherein the at least one spatial audio signal is associated with at least one metadata parameter, wherein the at least one metadata parameter comprises at least one of: a direction or direction-of-arrival; an energy ratio; a diffuseness ratio.

The apparatus caused to determine at least one direction parameter of at least one propagating sound may be caused to determine at least one of: at least one direction parameter of at least one propagating sound; at least one direction parameter of at least one audio source; at least one direction parameter of at least one reflection from at least one audio source; and at least one energy ratio parameter associated with the at least one direction parameter.

The apparatus caused to determine at least one direction parameter of at least one propagating sound may be caused to determine the at least one direction parameter associated with at least one frequency band of the at least one audio signal.

The at least one propagating sound associated with the at least one audio signal may comprise at least one of: a direct sound associated with at least one audio source within a space; a reflected sound associated with at least one audio source within a space; a sound associated with at least one virtual source; a reverberation sound; an ambient sound; and a superposition of any of the direct sound, reflected sound, reverberation sound and ambient sound.

The at least one propagating sound associated with the at least one audio signal may be relative to a recording position from which the at least one audio signal is captured.

The apparatus caused to determine at least one direction of at least one sound source associated with the at least one audio signal may be caused to: obtain at least one image; analyse the at least one image to determine within the image at least one object of interest; and determine based on a location of the at least one object of interest within the at least one image and image capture parameters the at least one direction of at least one sound source.

The apparatus caused to analyse the at least one image to determine within the image at least one object of interest may be caused to identify at least one talker, based on identifying a face from the at least one image and further based on identifying motion of lips within the face between images.

The apparatus caused to determine the at least one direction of at least one sound source may be caused to perform at least one of: analyse at least one signal from at least one infra-red sensor to determine the at least one direction of at least one sound source; analyse at least one signal from at least one sensor to determine the at least one direction of at least one sound source; obtain at least one user-input signal identifying the at least one direction of at least one sound source; obtain at least one positioning signal associated with an object, from which the at least one direction of at least one sound source is determined; analyse the at least one audio signal, when the at least one audio signal comprises two or more microphone audio signals; and obtain metadata associated with the at least one audio signal, the metadata comprising directional or location information, from which the at least one direction of at least one sound source is determined when the at least one direction parameter of at least one propagating sound is determined from an analysis of the at least one audio signal.

The apparatus caused to modify the at least one direction parameter in accordance with the determined at least one direction may be caused to: determine an angular difference between the at least one direction parameter and the at least one direction of at least one sound source; compare the angular difference against a threshold value, wherein where the angular difference is larger than the threshold value then the at least one direction parameter is passed unmodified but where the angular difference is smaller than the threshold value then the at least one direction parameter is modified towards the at least one direction of the at least one sound source.

The apparatus caused to modify the direction parameter towards the at least one direction of the at least one sound source may be caused to modify the direction parameter to be at the at least one direction of the at least one sound source when the angular difference is less than a determined smaller threshold value and apply an interpolated modification to the direction parameter when the angular difference is more than the determined smaller threshold value but less than the threshold value.

The apparatus may be further caused to: determine at least one transport audio signal based on the at least one audio signal; and output the at least one transport audio signal with the modified direction parameter.

The apparatus may be further caused to: analyse the at least one audio signal, when the at least one audio signal comprises at least two microphone audio signals, to determine at least one metadata parameter, wherein the at least one metadata parameter may comprise at least one of: an energy ratio; and a diffuseness ratio; output the at least one metadata parameter with the modified direction parameter.

According to a sixth aspect there is provided an apparatus comprising at least one processor and at least one memory including a computer program code, the at least one memory and the computer program code configured to, with the at least one processor, cause the apparatus at least to: obtain at least one transport audio signal; determine at least one direction parameter of at least one propagating sound associated with the at least one transport audio signal; determine at least one direction of at least one sound source associated with the at least one transport audio signal; modify the at least one direction parameter in accordance with the determined at least one direction; and output the modified at least one direction parameter.

According to a seventh aspect there is provided an apparatus comprising: obtaining circuitry configured to obtain at least one audio signal; determine at least one direction parameter of at least one propagating sound associated with the at least one audio signal; determining circuitry configured to determine at least one direction of at least one sound source associated with the at least one audio signal; modifying circuitry configured to modify the at least one direction parameter in accordance with the determined at least one direction; and outputting circuitry configured to output the modified at least one direction parameter.

According to an eighth aspect there is provided an apparatus comprising: obtaining circuitry configured to obtain at least one transport audio signal; determine at least one direction parameter of at least one propagating sound associated with the at least one transport audio signal; determining circuitry configured to determine at least one direction of at least one sound source associated with the at least one transport audio signal; modifying circuitry configured to modify the at least one direction parameter in accordance with the determined at least one direction; and outputting circuitry configured to output the modified at least one direction parameter.

According to a ninth aspect there is provided a computer program comprising instructions [or a computer readable medium comprising program instructions] for causing an apparatus to perform at least the following: obtaining at least one audio signal; determine at least one direction parameter of at least one propagating sound associated with the at least one audio signal; determining at least one direction of at least one sound source associated with the at least one audio signal; modifying the at least one direction parameter in accordance with the determined at least one direction; and outputting the modified at least one direction parameter.

According to a tenth aspect there is provided a computer program comprising instructions [or a computer readable medium comprising program instructions] for causing an apparatus to perform at least the following: obtaining at least one transport audio signal; determine at least one direction parameter of at least one propagating sound associated with the at least one transport audio signal; determining at least one direction of at least one sound source associated with the at least one transport audio signal; modifying the at least one direction parameter in accordance with the determined at least one direction; and outputting the modified at least one direction parameter.

According to an eleventh aspect there is provided a non-transitory computer readable medium comprising program instructions for causing an apparatus to perform at least the following: obtaining at least one audio signal; determine at least one direction parameter of at least one propagating sound associated with the at least one audio signal; determining at least one direction of at least one sound source associated with the at least one audio signal; modifying the at least one direction parameter in accordance with the determined at least one direction; and outputting the modified at least one direction parameter.

According to a twelfth aspect there is provided a non-transitory computer readable medium comprising program instructions for causing an apparatus to perform at least the following: obtaining at least one transport audio signal; determine at least one direction parameter of at least one propagating sound associated with the at least one transport audio signal; determining at least one direction of at least one sound source associated with the at least one transport audio signal; modifying the at least one direction parameter in accordance with the determined at least one direction; and outputting the modified at least one direction parameter.

According to a thirteenth aspect there is provided an apparatus comprising: means for obtaining at least one audio signal; determine at least one direction parameter of at least one propagating sound associated with the at least one audio signal; means for determining at least one direction of at least one sound source associated with the at least one audio signal; means for modifying the at least one direction parameter in accordance with the determined at least one direction; and means for outputting the modified at least one direction parameter.

According to a fourteenth aspect there is provided an apparatus comprising: means for obtaining at least one transport audio signal; means for determine at least one direction parameter of at least one propagating sound associated with the at least one transport audio signal; means for determining at least one direction of at least one sound source associated with the at least one transport audio signal; means for modifying the at least one direction parameter in accordance with the determined at least one direction; and means for outputting the modified at least one direction parameter.

According to a fifteenth aspect there is provided a computer readable medium comprising program instructions for causing an apparatus to perform at least the following: obtaining at least one audio signal; determine at least one direction parameter of at least one propagating sound associated with the at least one audio signal; determining at least one direction of at least one sound source associated with the at least one audio signal; modifying the at least one direction parameter in accordance with the determined at least one direction; and outputting the modified at least one direction parameter.

According to a sixteenth aspect there is provided a computer readable medium comprising program instructions for causing an apparatus to perform at least the following: obtaining at least one transport audio signal; determine at least one direction parameter of at least one propagating sound associated with the at least one transport audio signal; determining at least one direction of at least one sound source associated with the at least one transport audio signal; modifying the at least one direction parameter in accordance with the determined at least one direction; and outputting the modified at least one direction parameter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
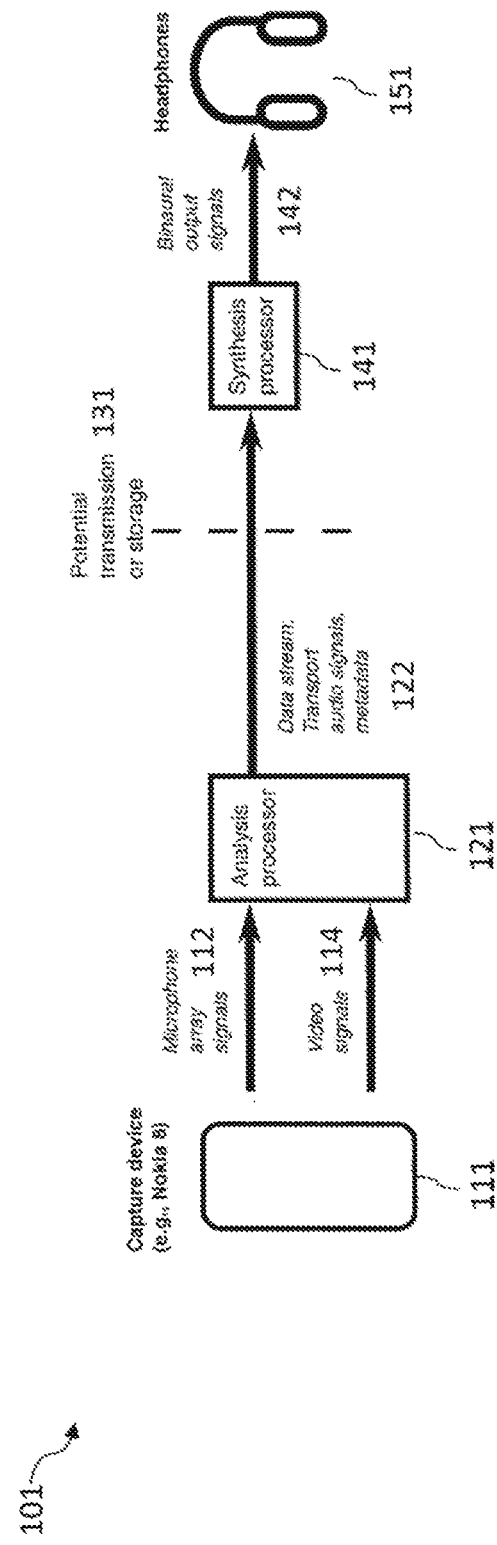
FIG. 1 shows schematically an example system suitable for implementing some embodiments.

The following describes in further detail suitable apparatus and possible mechanisms for the provision of efficient capture and rendering of spatial audio signals.

The concept as discussed in the embodiments hereafter is based on using estimates of likely source positions and adjusting the directional estimates nearer to the likely source positions.

Furthermore, although the concept and the embodiments detailing this concept are described in the context of SPAC as a standalone method, it can be used in any context that estimates parametric directions from an audio signal and enables the obtaining of another, preferably more stable, direction estimate.

For example, the concept may be applied to Directional Audio Coding (DirAC) methods. In other words the concept may be applicable to audio codecs that apply direction-based parametric models and, as such, this could be applied, for example, to 3GPP Immersive Voice and Audio Services (IVAS) or Moving Picture Experts Group-Immersive (MPEG-I) codecs.

The embodiments attempt to improve on state-of-the-art spatial audio capture methods which are based on estimating at least one direction parameter in frequency bands and rendering the spatial sound at the frequency bands according to these direction parameters. The process is performed in short time intervals usually referred as audio frames, to take into account the time varying nature of most audio signals. A frequency band of the signal of an audio frame may be referred as a time-frequency tile. The direction parameter typically refers to the dominating direction-of-arrival of propagating sound in the recording position in a time-frequency tile. It should be noticed that this direction does not necessarily point to any actual sound source, but it is a superposition of sounds from, e.g., the actual sound sources, reflections of the sound from hard surfaces such as walls, reverberation (which refers to the diffuse late reverberation where the listener no longer can perceive any apparent direction for the reflection), and ambient sounds (sounds without any apparent direction of arrival such as noises).

Other parameters which may be determined include the direct-to-total ratio parameter (or a similar parameter such as diffuseness parameter or directional stability parameter) in frequency bands, which typically indicates how much of the sound energy comes from the indicated direction of the frequency band, and how much of the sound energy is ambient or surrounding. There may be one or more simultaneous direction estimates at each band, and correspondingly one or more of the ratio or energy parameters indicating how directional the sound is at the frequency bands.

Ideally, with such a system, when a source is active at a certain direction with respect to the capture device, the corresponding amount of sound energy is reproduced at that direction with respect to the reproduction device, creating a realistic perception of a source at that direction.

There are various factors that may affect the quality of the directional metadata at least at some frequency bands, for example:

The capture device is typically held in a hand (especially in the case of a mobile device). It may be held in various ways, affecting the acoustic properties of the device. The high frequency analysis can especially be erroneous due to acoustic effects associated with the hand (shadowing of certain frequencies, other wave phenomena as sound waves reflecting/diffracting from the hand).

Some devices may store the microphone audio signals in an encoded form, for example, as AAC encoded audio signals. These AAC audio signals are decoded, for example, in a computer, where the spatial analysis is performed. The AAC encoding can cause errors in spatial estimates (due to the masked quantization noise).

The device can be protected by a wind cover, or protective cover, affecting the acoustic properties.

Wind or other noise sources can affect the directional estimates.

The acoustic ambience itself typically causes the directional estimates to fluctuate unnecessarily much.

In addition, there can be various further practical reasons that affect the microphone audio signals at the stage where the spatial analysis at frequency bands is performed with the microphone signals.

The embodiments as described herein attempt to produce directional metadata estimated which are less erroneous or noisy. For example the direction estimates produced in some embodiments are more stable and therefore less fluctuating in a stochastic manner (noise) or are more correct and less erroneous or offset in a systematic manner (e.g., due to acoustic effect such as the user's hand).

Thus embodiments as described hereafter attempt to reduce the effect that whenever a single prominent source is active, for example, in a case of reproducing a sound of a talker in an acoustic space, the reproduction of that source is such that some frequencies may be reproduced at the appropriate direction, while some (or all) frequencies may have some directional offset, error, or noise. This may therefore reduce the effect that the point source is not reproduced only at that direction, but over an arc or area of directions generally at the appropriate direction. In other words the embodiments attempt to reduce such spreading (other than the spreading performed intentionally, for known spatial reproduction effects for synthesizing spatially spread (or extended) sound sources (e.g., crowds, ocean shore)).

Thus in embodiments the device and method aim to reproduce audio sources in spatially precise manner, which may have the effect especially for speech signals that their intelligibility is improved.

Conventional methods for determining a direction parameter in frequency bands such as Directional Audio Coding (DirAC), that operates on the first order Ambisonics (FOA) signal, or any of its variants are known.

A FOA signal can be generated by designing and applying appropriate filters (or complex gains in frequency bands) for the microphone array signals. Such gains in frequency bands can be generated for example by measuring the impulse response of the device from (approximately) equally distributed points, and using least-squares optimization methods to derive a set of mixing gains to obtain a frequency band FOA signal from the frequency band microphone array signals, for each frequency band below the spatial aliasing frequency.

The FOA signals have an omnidirectional component $w(k,n)$ and the three orthogonal dipole components $x(k,n)$, $y(k,n)$ and $z(k,n)$, where k is the frequency index and n is the time index. Following the concepts of DirAC, the direction can be determined based on the vector $I(k, n)$ $$I(k, n) = \text{Re}\left(w(k, n)\begin{bmatrix} x^*(k, n) \\ y^*(k, n) \\ z^*(k, n) \end{bmatrix}\right)$$

Where Re denotes the real-part and * denotes the complex conjugate. The direction-of-arrival is then the direction of $I(k, n)$. Note that $I(k, n)$ may be averaged over several frequency and/or time indices $(k,n)$.

DirAC may also estimate the diffuseness which is a ratio factor between 0 and 1 that determines how much of the total sound energy is non-directional. The methods are well documented in the literature.

There are also known other methods which can operate on the Ambisonics signals. For example, the Harmonic plane-wave expansion (Harpex) and its variants estimate two simultaneous directions-of-arrival from the FOA signal. Another example is the Higher-order DirAC (HO-DirAC), that estimates more than one directions of arrival in sectors from the second or higher order Ambisonic signals. Such Ambisonic signals require more microphones from the device, for example, ideally at least 9 microphones for second order.

One method that may estimate the direction-of-arrival especially at high frequencies is described in US20130230187A1. In the method, a vector is determined to express each microphone of the array, and the length of the vector is the estimated energy (or magnitude) of that microphone signal in frequency bands. The direction-of-arrival is then the direction of the sum of these vectors.

Another method, which is especially relevant for mobile phone implementations, has been proposed in PCT published patents WO2018/091776, WO2018/060549, US20130044884. In these methods a delay-search algorithm is applied to determine such a delay that produces the maximum coherence between the microphone signals. For example, a delay parameter is determined between the left and right microphone signals of the mobile phone in the landscape mode. The delay is normalized so that the maximum delays (the sound arriving from the axis of the microphones) are −1 and 1. The angle parameter is then a cos(d), where d is the estimated and normalized delay parameter. Such delay and angle parameter are ambiguous: The same delay can be observed for example if the sound comes 30 degrees (at the front side) and 150 degrees (at the rear side).

In order to solve this ambiguity, the mobile capture methods also determine a binary front-back choice to determine if the sound comes from the front or the back. This is obtained by performing the delay-analysis at a front-back microphone pair. The delay analysis can be very noisy due to the small microphone spacing (flat device), however, it may be robust enough to simply determine if the sound generally comes from the front or rear side of the device.

The aforementioned method is particularly suitable for flat devices, where one axis is only for front-back analysis. The method however is suboptimal for non-flat devices such as VR cameras due to uneven performance at certain directions. VR cameras could use for example DirAC, but DirAC and similar methods function only below the spatial aliasing frequency. US20130230187A1 would be applicable above the spatial aliasing frequency but requires prominent acoustic shadowing. In PCT application number PCT/FI2019/050239 a delay-search method for non-flat devices without substantial acoustic shadowing at some axes was discussed. The method forms delays between the signals of several microphone pairs and uses vector algebra to determine the direction parameter.

The concept relates to parametric spatial audio capture using microphone arrays where a novel direction-analysis solution is presented that provides improved spatial stability for dominant sound sources (e.g., talkers).

In some embodiments the novel direction analysis is based on combining time-frequency domain direction-of-arrival estimates of propagating sound with broadband direction estimate(s) of sound source(s). The method may be summarised in some embodiments by:
  obtaining spatial audio signals;
  obtaining direction-of-arrival estimates of propagating sound in the time-frequency domain for the spatial audio signals;
  obtaining broadband direction estimate(s) of sound source(s);
  biasing the time-frequency domain direction estimates towards the broadband direction estimate(s); and
  outputting the biased time-frequency domain direction estimates as direction metadata.

The direction-of-arrival estimate of propagating sound refers to the estimate of the dominant direction of the sound arrival in the recording position for a time-frequency tile. It can relate, for example to an actual sound source, a reflection, reverberation, ambient sounds, or a superposition of these all (as is typically the case).

The broadband direction estimate of a sound source refers to the estimate of the actual direction of a sound source, for example a talker. There may be estimates for multiple sound sources. It should be noted that the sound does not necessarily come dominantly from these directions at some (or even any) frequency bands, but instead these are the directions where the sound sources actually are.

The proposed embodiments therefore aim to improve the perceived quality of the spatial audio by combining the two estimates in order to produce new direction estimates. This approach may utilize the benefits of both estimates ("direction-of-arrival estimates of propagating sound" capture the spatial impression accurately, whereas "direction estimates of sound sources" capture the directions of actual sources accurately). Reproducing the spatial audio using the new direction estimates may as discussed above produce a perception of more point-like and spatially stable sound sources while maintaining the spatial impression of the original direction metadata. In addition, typically, these methods and apparatus implementing them may improve the intelligibility of speech.

The spatial audio signals described in further detail hereafter can be microphone-array signals which can be obtained, for example, from mobile devices or virtual-reality cameras or any suitable device. The time-frequency domain direction estimates can be analysed using any suitable method, for example, using spatial audio capture (SPAC) as discussed above.

The broadband direction estimates of talkers can be obtained based on any suitable method and using any suitable source data for the determination. For example in the following examples the source data is image data taken from video capture (or cameras) and the determination using visual source detection methods. An example of visual source detection methods is face detection and tracking. In some other embodiments the broadband estimates can be obtained based on using the microphone-array signals and acoustic source detection methods. In some further embodiments the obtaining of the broadband estimates can be from metadata which represents the positions of sound objects known to be captured in the spatial audio signal. Other embodiments may be configured to perform object tracking using various other means such as radio-based indoor positioning or manual tracking by a human operator.

The biasing can be implemented in some embodiments such that if the difference between the time-frequency domain direction estimate and the broadband estimate is below a threshold, the time-frequency domain direction estimate is biased towards the broadband estimate. Otherwise in such embodiments the original time-frequency domain direction estimate is output or provided unmodified. As a result, the direction estimates are more stable and accurate, but the general spatial impression of the sound scene is not altered.

In some embodiments, the spatial audio signals can be a defined number (N) channels of transport signals (for example two microphone audio signals, stereo audio signals, FOA/HOA, binaural audio signals), and the time-frequency-domain direction-of-arrival estimates are obtained from spatial metadata, which represents the content of a spatial audio scene. In such embodiments the method can be executed at any stage of the signal processing chain following the analysis, such as: within the transmission system, within the transmission mixer, within the early stages of synthesis. In other words any place where metadata and the broadband estimate(s) are available. The broadband estimate(s) can also be signalled through a transmission system to the synthesis part of the system in some embodiments.

With respect to FIG. 1 is shown an example system 101. The example system 101 comprises a capture device 111. In this example the capture device 111 is a mobile phone (for example a Nokia 8) comprising two or more microphones configured to generate microphone audio signals 112 (which may be also known as microphone array signals) and a camera or cameras configured to generate video signals (or image data) 114. In some embodiments the mobile phone comprising two microphones may be used to estimate a direction parameter (and spatial sound can be reproduced) for a 180-degree arc (for example at the front of the mobile device). In some embodiments where the mobile phone comprises three microphones a 360-degree horizontal direction parameter may be estimated and where the mobile phone comprises four (or more) microphones, the direction parameter may be estimated in 3D (in other word the direction parameter may comprise an elevation component as well as an azimuth component).

Although the example capture device 111 in these examples is shown as a mobile phone it may be understood that in some embodiments the capture device 111 is any suitable electronic apparatus or system comprising two or more microphones in the embodiments where the microphone audio signal is analysed to determine the time-frequency (TF) domain direction, for example a VR/AR capture apparatus such as the Nokia OZO which comprises both microphones and cameras.

The microphone array audio signals 112 and the video signals 114 can be passed to an analysis processor 121.

In some embodiments the system 101 comprises an analysis processor 121. The analysis processor 121 can in some embodiments be configured to receive (or otherwise obtain) the input signals, for example the microphone array audio signals 112 and the video signals 114. The analysis processor 121 is configured to generate transport audio signals based on the microphone signals and spatial metadata. The spatial metadata generated by the analysis processor 121 can in some embodiments comprise a direction parameter for frequency bands and typically, a direction-to-total energy ratio parameter or a similar parameter in frequency bands. In some embodiments the analysis processor 121 is configured to generate other parameters for the spatial metadata.

The analysis processor 121 in some embodiments can be configured to utilize only data from the microphone array signals, in other words to perform source detection using acoustic means instead of visual means. In some embodiments the analysis processor 121 is configured to utilize information from other sources, such as Infrared (IR) or other sensors, or user input (source selection from a touch screen etc.). In some embodiments the analysis processor 121 is configured to utilize information from any general tracking services, such as GPS, High Accuracy Indoor Positioning (HAIP). In some embodiments the analysis processor 121 is configured to utilize position information from metadata associated with audio objects known to be captured in the spatial audio signals. Furthermore in some embodiments the analysis processor 121 is configured to be implemented within an encoder of a codec (such as 3GPP IVAS or MPEG-I) where object direction obtained as an input to the encoder is passed into the analysis.

In some embodiments the analysis processor 121 is configured to generate the transport audio signals (e.g., two audio channels) based on the microphone audio signals (the transport audio signals in some embodiments may be the microphone audio signals output without any additional processing). The transport audio signals and the metadata can in some embodiments be passed to the synthesis processor after transmission or storage as a data stream 131.

Transmission or storage is shown in FIG. 1 by reference 131. The transport audio signals and the spatial metadata may for example be encoded before transmission or storage. For example, the audio signals could be encoded using Advanced Audio Coding (AAC), and the spatial metadata could be encoded in any suitable way and embedded within metadata fields of the AAC stream. In some embodiments, the encoded audio signal may be transmitted in a media container with a video stream, such as an encoded video stream based on the video signals generated by the mobile phone. In such embodiments when video encoding takes place, the signals and metadata are correspondingly decoded prior to the synthesis processor 141. Some examples of transmission or storage may be:

encoding the audio and metadata, storing it to the memory on the mobile phone, and decoding the audio at the later stage for synthesis processing at the same (or different) device;

encoding the audio and metadata and transmitting it to a remote device for encoding and synthesis processing;

directly providing the audio and metadata to the synthesis processor without encoding;

encoding the audio and metadata as above, transmitting it to a remote device for storage. The remote device making the encoded audio and metadata available for download by clients. Clients downloading packets of the encoded audio and metadata, defragmenting the downloaded packets, decoding them, and then feeding to the synthesis on the client.

The encoding may in some embodiments take place in the analysis processor, and the decoding may take place in the synthesis processor. If the audio and metadata are provided directly from the analysis processor to the synthesis processor, encoding/decoding may not be necessary.

In some embodiments the system 101 comprises a synthesis processor 141. The synthesis processor 141 is configured to receive the datastream 122 comprising the transport audio signals and the metadata. In some embodiments, where the data stream has been encoded and/or multiplexed, the data stream is decoded and/or demultiplexed. The transport audio signals and the spatial metadata (involving the bias-processed directions) are then processed in such a way (in frequency bands) that a spatialized output such as a binaural signal is generated. In some embodiments the synthesis processor 141 is configured to output other spatial audio signal formats such as Ambisonic signals and stereo or surround loudspeaker signals. In some embodiments, such as 360-video playback, the user's head movements may be tracked, and in such embodiments the synthesis processor 141 is configured to receive head-tracking information and generate a suitable output signal based on the head-tracking information.

The synthesis processor 141 can be configured to output the binaural output signals to a suitable output device, such as headphones 151. The headphones 151 or output device in some embodiments comprises a head-tracking sensor configured to generate head-tracking information which can be passed back to the synthesis processor 141. The output device, for example the headphones 151, can be configured to receive the output audio signals, for example the binaural output signals 142. The headphones 151 may then be configured to output the audio signals to the listener or user of the headphones 151.

Figure 2:
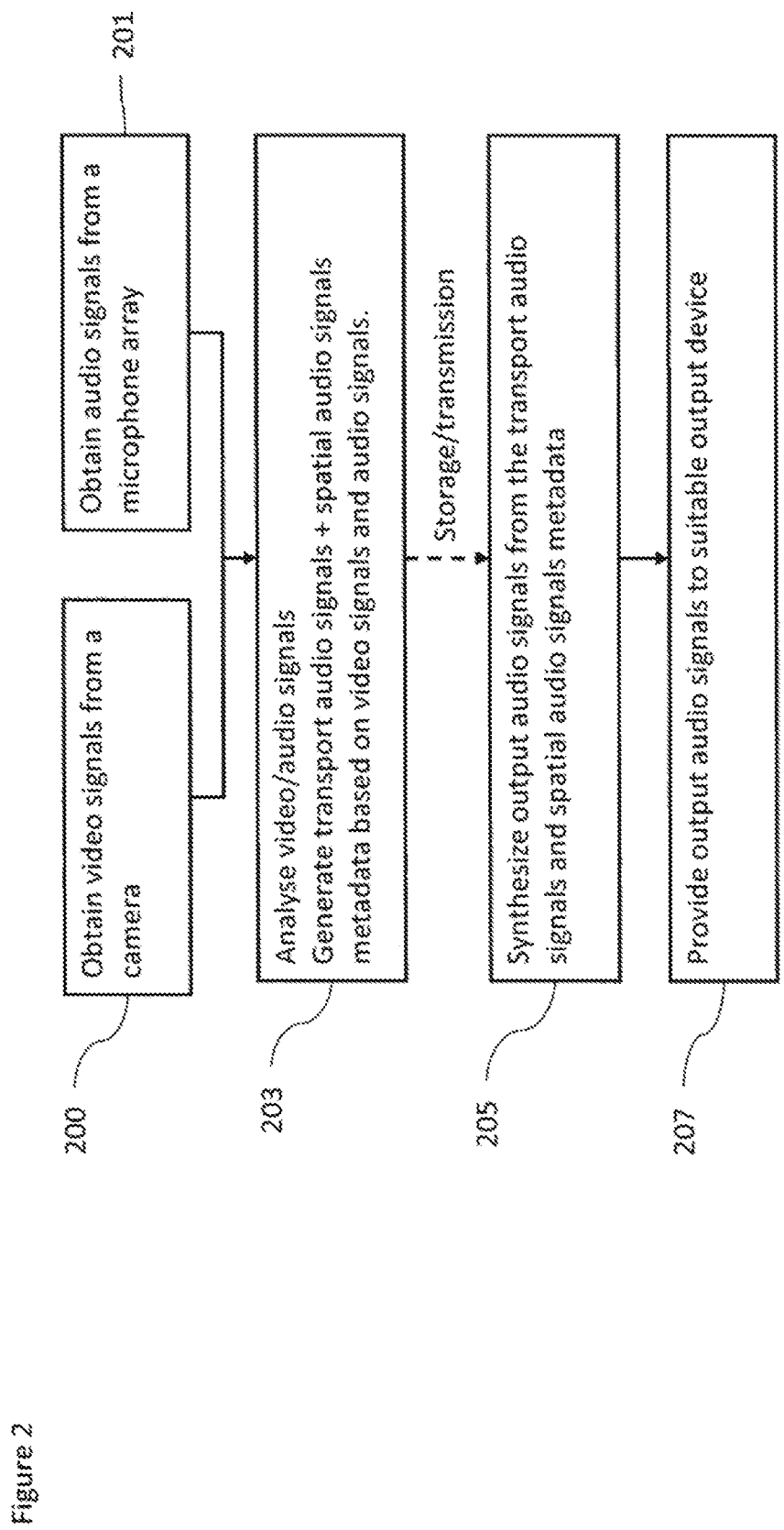
FIG. 2 shows a flow diagram showing operations of the example system as shown in FIG. 1 according to some embodiments.

The operation of the system as shown in FIG. 1 is shown by an example flow diagram in FIG. 2.

The operation of the system may comprise obtaining video signals from a camera as shown in FIG. 2 by step 200.

The method may further comprise obtaining audio signals from a microphone array as shown in FIG. 2 by step 201.

Having obtained the video and audio signals the method may comprise analysing video/audio signals to generate transport audio signals and spatial audio signals metadata based on the video signals and audio signals as shown in FIG. 2 by step 203.

Following an optional storage/transmission operation the next operation may be synthesizing output audio signals from the transport audio signals and spatial audio signals metadata as shown in FIG. 2 by step 205.

Then the output audio signals are provided to the output device as shown in FIG. 2 by step 207.

Figure 3:
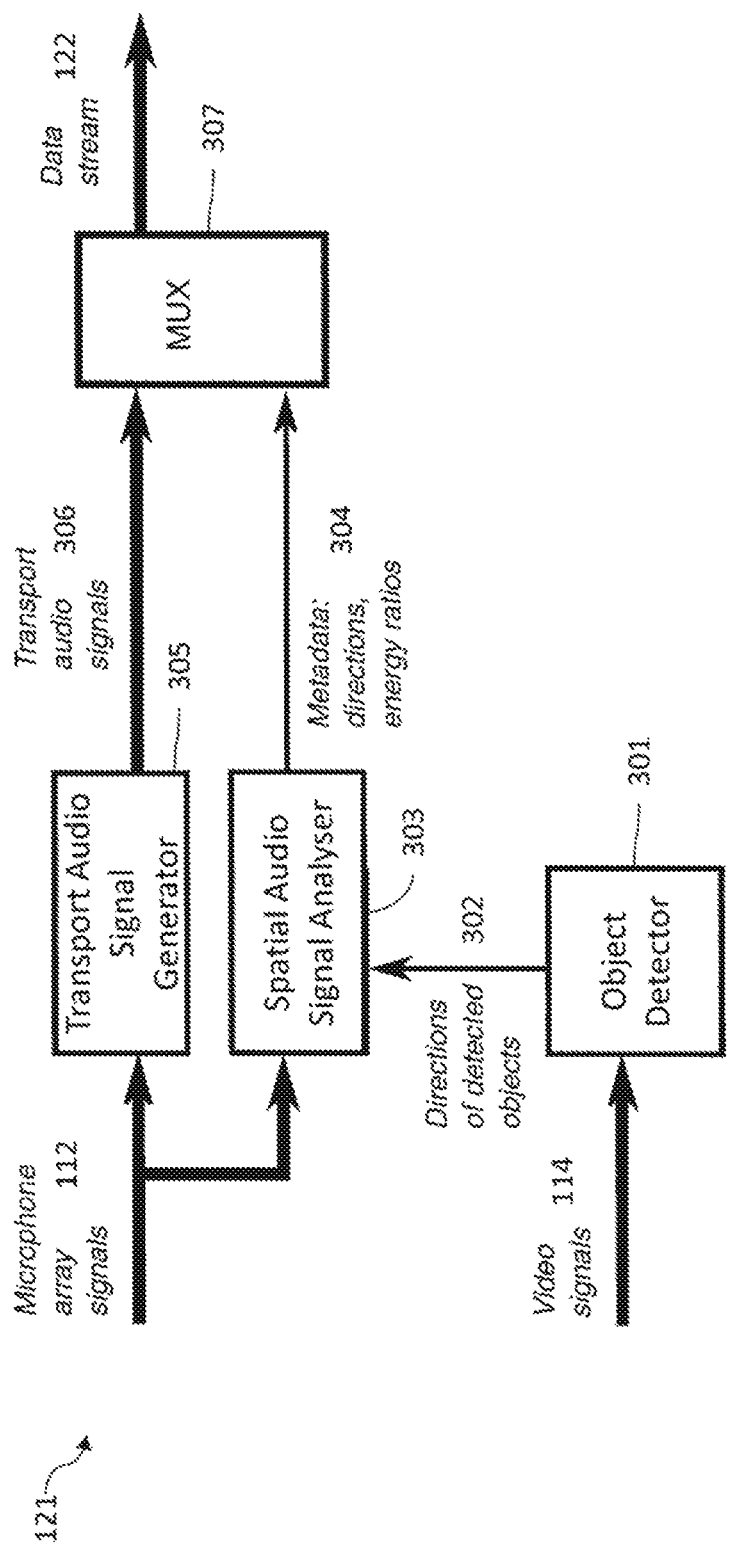
FIG. 3 shows schematically an example analysis processor as shown in FIG. 1 according to some embodiments.

With respect to FIG. 3 is shown an example of the analysis processor 121 according to some embodiments.

In some embodiments the analysis processor 121 comprises an object detector 301. The object detector 301 is configured to receive the video stream (or image data). The object detector may then be configured to find directions or angles based on the video signal(s) where the sources of interest reside. For example in some embodiments the object detector 301 can employ methods such as described in "You Only Look Once: Unified, Real-Time Object Detection", Joseph Redmon, Santosh Divvala, Ross Girshick, Ali Farhadi, CVPR 2016. In some embodiments the object detector 301 is configured to identify talkers, or people in general using any suitable method.

The method can in some embodiments be based on face detection and tracking between adjacent video or image frames. The output of the object detector 301 can be directions of the detected sound sources $\theta_{ss}(i, n)$ 302, where i is the index of the detected sound source, and n is the temporal frame index. There may be any number of detected sound sources, and the number of detected sources may change over time, although typically there may be only one or a few sources that are being detected. In some embodiments there can be at certain time instants no sound sources detected by the object detector 301 and the directions of detected objects information may be a null field or no signal is generated and passed to the spatial audio signal analyser 303.

The analysis processor 121 in some embodiments further comprises a transport audio signal generator 305. The transport audio signal generator 305 is configured to receive the microphone array audio signals 112 and generate transport audio signals 306. The microphone array audio signals $s_j(t)$, where t is the temporal sample index and j is the microphone channel index, can in some embodiments be processed by the transport audio signal generator to form two audio signal channels. For example in some embodiments the transport audio signal generator 305 is configured to generate one audio signal channel having (with respect to a defined front direction) the left-side sounds more prominently presented, and a second audio signal channel having the right-side sounds more prominently presented. Such a left-right audio signal configuration can be generated from the microphone array signals, for example, by selection of a suitable microphone pair or by beamforming. The transport audio signal generator 305 may be further configured to generate transport audio signals can involve the application of the audio signal processing effects such as equalization, noise-suppression, gain control, and limiter processing.

The analysis processor 121 in some embodiments further comprises a spatial audio signal analyser 303. The spatial audio signal analyser 303 is configured to receive the microphone array audio signals 112 and the directions of the detected sound sources $\theta_{ss}(i,n)$ as an input. The spatial audio signal analyser 303 is configured to generate metadata 304 using these inputs. The metadata 304 may comprise one or more direction parameters in frequency bands, and typically an energy ratio parameter (or several ratio parameters) in frequency bands indicating how much of the sound energy is directional (with respect to each of the one or more directions) and how much of the sound energy is ambience. An example parameterization would be one direction parameter in each frequency band $\theta(k, n)$ and an associated direct-to-total energy ratio in each frequency band $r(k, n)$, where k is the frequency band index and n is the temporal frame index. The metadata may in some embodiments be output to the multiplexer 307.

In some embodiments the analysis processor 121 comprises a multiplexer or MUX 307. The multiplexer 307 is configured to receive the transport audio signals 306 and the metadata 304. The transport audio signals 306 and the spatial metadata 304 may be multiplexed into one stream by the multiplexer 307 and output as a datastream 122. In some embodiments the multiplexer 307 is configured to encode the transport audio signals 306 and the spatial metadata 304, for example in a manner as discussed. In some embodiment the multiplexer 307 is optional or can be configured to be bypassed, with the transport audio signals 306 and the spatial metadata 304 being output without encoding and/or multiplexing.

Figure 4:
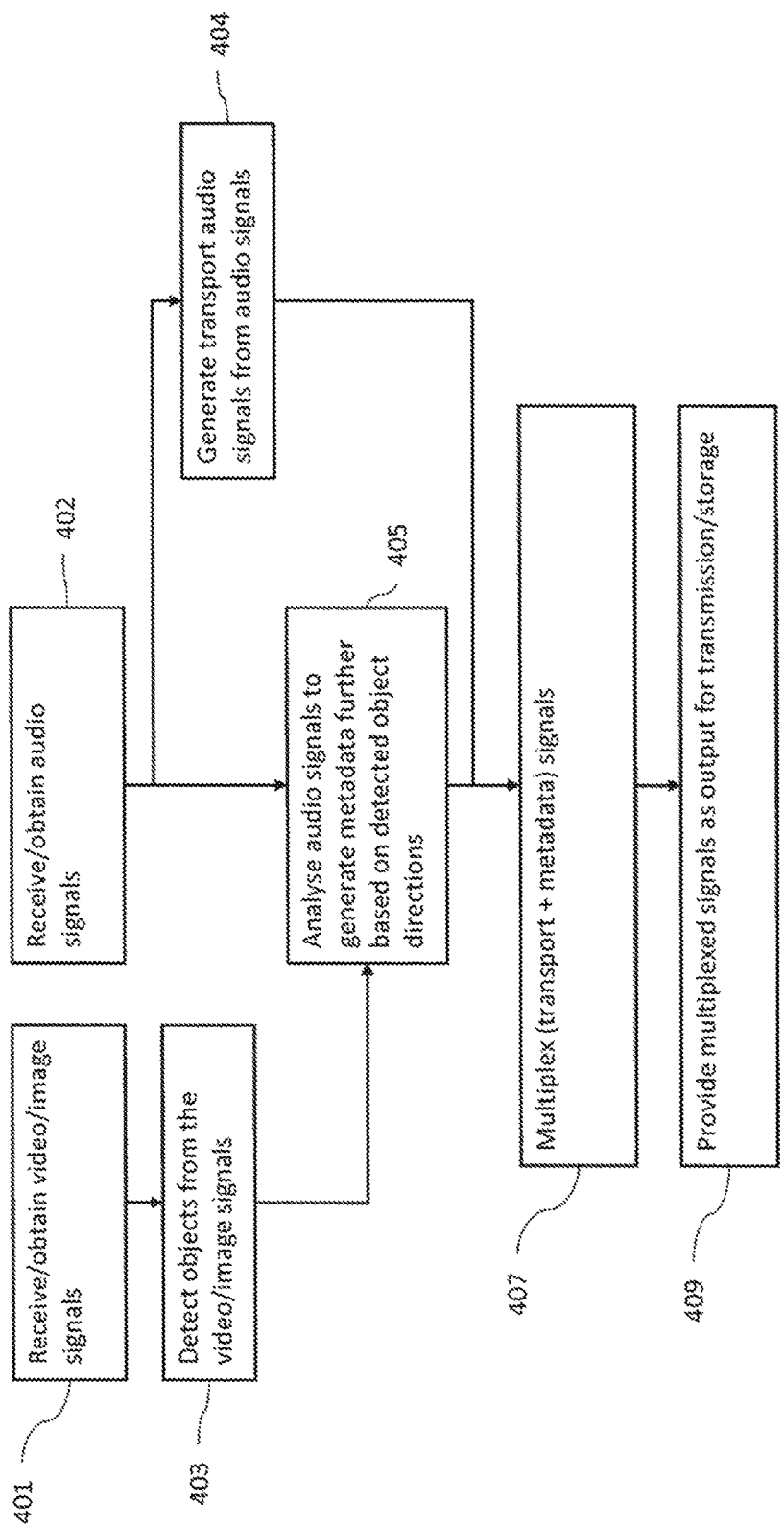
FIG. 4 shows a flow diagram of the operation of the example analysis processor shown in FIG. 3 according to some embodiments.

With respect to FIG. 4 is shown an example flow diagram of the operation of the analysis processor 121 as shown in FIG. 3.

The method may comprise receiving or obtaining the video/image signals as shown in FIG. 4 by step 401.

Having received or obtained the video/image signals then the next operation is one detecting objects from the video/image signals as shown in FIG. 4 by step 403.

Additionally in some embodiments audio signals are obtained or received as shown in FIG. 4 by step 402.

Having received or obtained the audio signals and furthermore having detected the objects (and determined an object direction) the method may comprise analysing the audio signals to generate metadata further based on the detected object directions as shown in FIG. 4 by step 405.

Additionally having received or obtained the audio signals from the microphones the transport audio signals may be generated from the audio signals as shown in FIG. 4 by step 404.

Having generated the transport audio signals and the metadata the next operation may be a multiplexing of the transport audio signals and the metadata into a datastream as shown in FIG. 4 by step 407.

The multiplexed signals may then be provided as an output for transmission and/or storage as shown in FIG. 4 by step 409.

Figure 5:
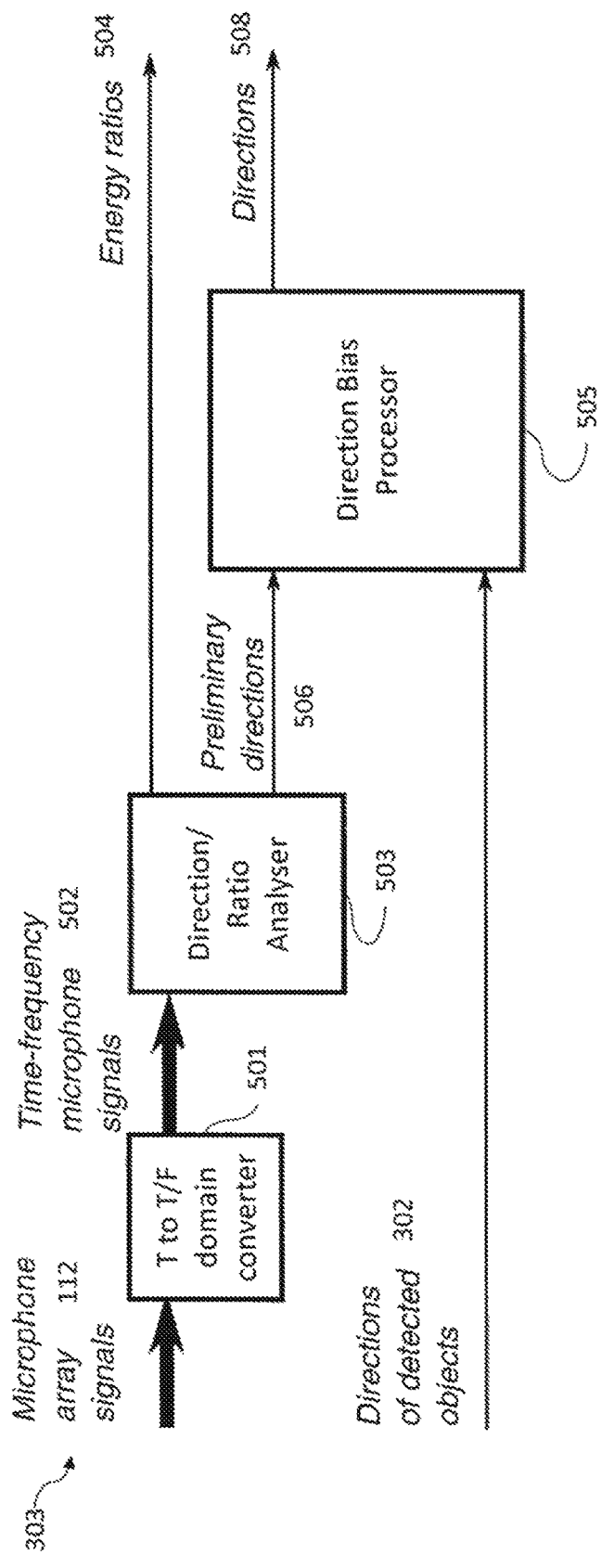
FIG. 5 shows schematically an example spatial audio signal analyser as shown in FIG. 3 according to some embodiments.

With respect to FIG. 5 an example spatial audio signal analyser 303 is shown in further detail. In some embodiments the spatial audio signal analyser 303 comprises a time to time-frequency domain converter (T to T/F domain converter) 501. The time to time-frequency domain converter 501 is configured to receive the microphone array audio signals $s_j(t)$ 112 and transform them into time-frequency signals $S_j(k, n)$ 502 by any suitable time-frequency transform. An example of a suitable time-frequency transform is a short-time Fourier transform (STFT). The transformed time-frequency microphone signals 502 in some embodiments are output to the direction/ratio analyser 503.

The spatial audio signal analyser 303 may comprise a direction/ratio analyser 503 which is configured to receive the time-frequency microphone audio signals 502. The direction/ratio analyser 503 is configured to estimate preliminary directions $\theta_{pd}(k, n)$ and energy ratios $r(k, n)$ in the time-frequency domain. The preliminary directions $\theta_{pd}(k, n)$ are the estimates of the dominating direction-of-arrival of the propagating sound. The method implemented for determining the directions and the ratios depends on the device type. For example in some embodiments the determination or estimation can be a spatial audio capture (SPAC) implementation.

Thus for example in embodiments implemented based on audio signals captured from a mobile phone, the non-uniform shape of the device means that one of the axes (front-back) is typically very thin, which results in the differential information with respect to the front-back axis between the microphone signals is small. In other words, that axis has a lower signal-to-noise ratio in terms of the parameter analysis when compared to the longer left-right axis. Therefore, a suitable choice for such a device is to use this information to make a binary front-back determination, and to estimate the direction based on the audio signals from the microphones at the longer axes.

The procedure can be the following to estimate the preliminary direction parameter in horizontal plane from a device with three microphones:
Estimate a delay parameter d(k, n) in frequency bands between the left and right microphones (of the camera phone in a landscape mode);
Normalize the delay parameter d'(k, n) to be between −1 and 1, such that the maximum values are obtained when the sound arrives from the axis determined by the left-right microphone pair;
Obtain an angle parameter indicating the direction between −90 and 90 degrees by α(k, n)=arcsin (d'(k, n));
Estimate a delay parameter $d_{fb}(k, n)$ in frequency bands between front and back microphones (one of these could be the same as the left and right microphone);
Find if the front-back delay parameter $d_{fb}(k, n)$ is positive or negative. In case the delay parameter indicates the sound arriving from the rear, determine the preliminary direction by $\theta_{pd}(k, n)=180°-\alpha(k, n)$. Otherwise $\theta_{pd}(k, n)=\alpha(k, n)$.

The preliminary directions $\theta_{pd}(k, n)$ can then be passed to the direction bias processor 505. These time-frequency domain direction estimates could be referred to as "parametric based direction-of-arrival estimates".

In some embodiments where the device shape is such that it enables sufficiently robust linear generation of first-order Ambisonic (FOA) signals, then a DirAC method may be used to generate the preliminary direction parameters.

In some embodiments the direction/ratio analyser 503 is configured to generate or estimate the energy ratio parameters based on the normalized (between −1 and 1) cross-correlation parameter c(k, n) between a microphone pair at band k. In some embodiments one method to determine the energy ratio parameter is to compare the normalized cross-correlation parameter c(k, n) to a diffuse field normalized cross correlation parameter $c_D(k, n)$ and determine the ratio by $$r(k, n) = \frac{c(k, n) - c_D(k, n)}{1 - c_D(k, n)}.$$

These ratios 504 can then be output.

The spatial audio signal analyser 303 may comprise a direction bias processor 505. The direction bias processor 505 is configured to receive the preliminary directions $\theta_{pd}(k, n)$ and detected objects $\theta_{ss}(i, n)$. Based on these values the direction bias processor is configured to determine actual direction parameters $\theta(k, n)$ 508 which can be output.

Figure 6:
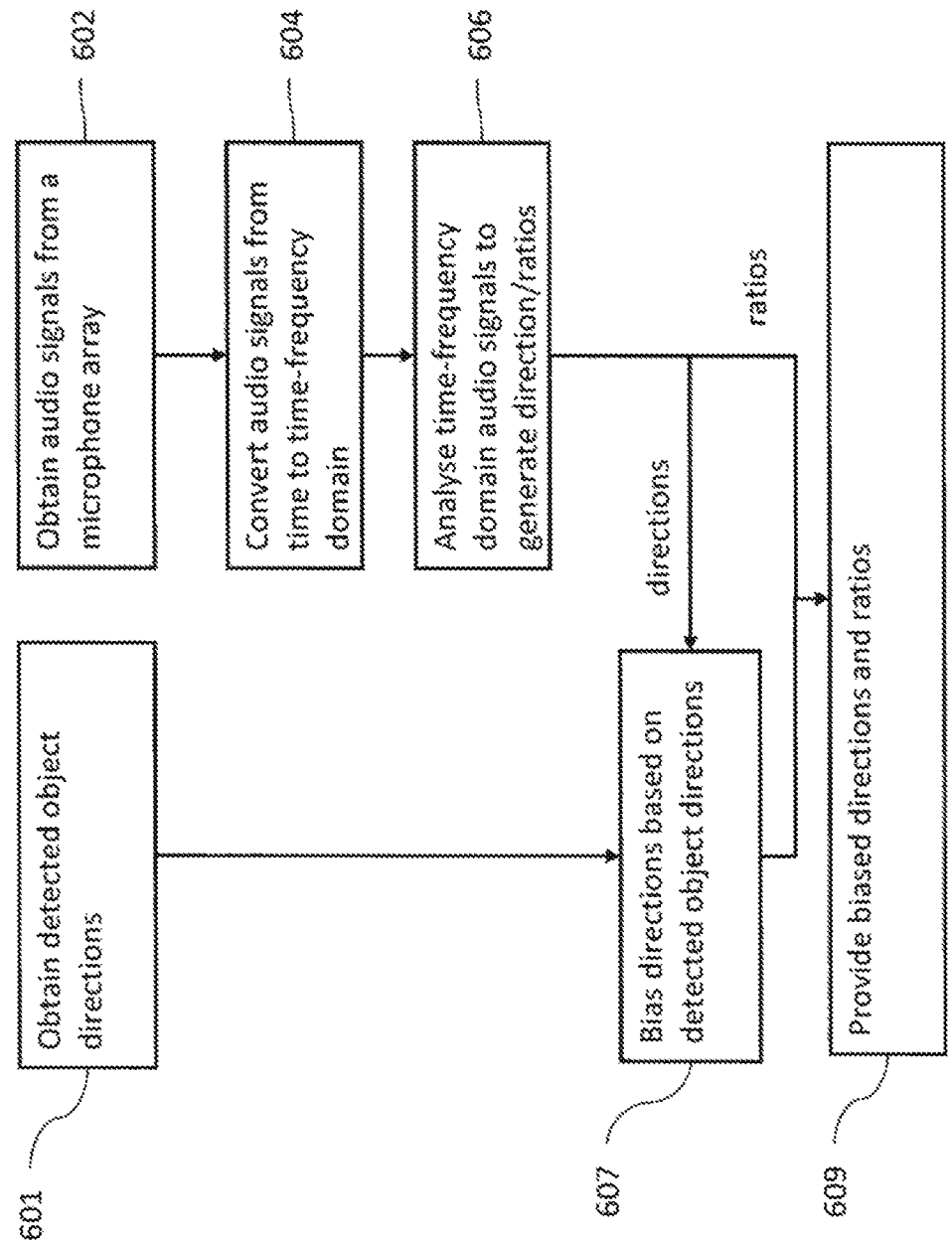
FIG. 6 shows a flow diagram of the operation of the example spatial audio signal analyser shown in FIG. 5 according to some embodiments.

With respect to FIG. 6 a flow diagram showing the operation of the example spatial audio signal analyser 303 is shown.

The detected object directions are obtained or received as shown in FIG. 6 by step 601.

The audio signals from the microphone array is furthermore obtained or received as shown in FIG. 6 by step 602.

Having obtained/received the audio signals from the microphone array, the time domain audio signals are converted to a time-frequency domain audio signal format as shown in FIG. 6 by step 604.

The time-frequency domain audio signals are then analysed to determine preliminary direction parameters and ratio parameters as shown in FIG. 6 by step 606.

Using the time-frequency domain audio signal based direction parameters and the detected object directions then the time-frequency domain audio signal based directions can be biased by the detected object directions as shown in FIG. 6 by step 607.

The biased directions and the ratio parameters are then provided as shown in FIG. 6 by step 609.

Figure 7:
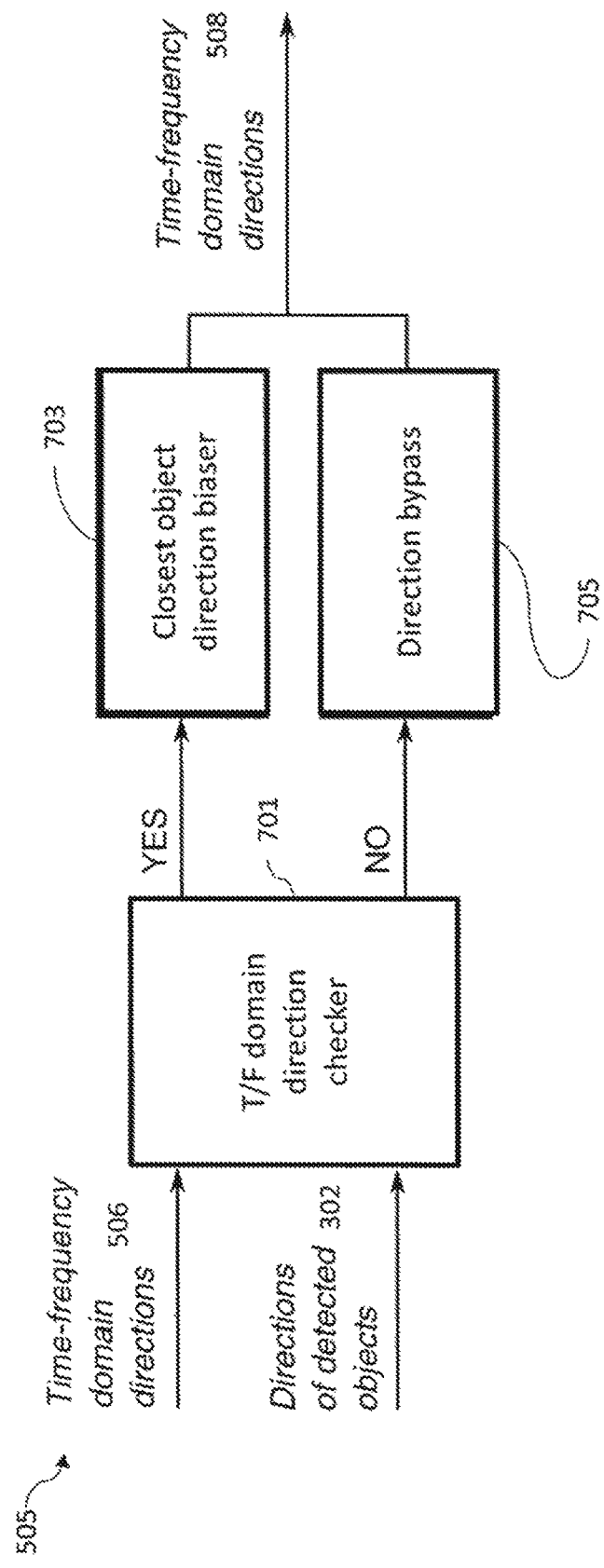
FIG. 7 shows schematically an example direction bias processor as shown in FIG. 5 according to some embodiments.

With respect to FIG. 7 is shown an example direction bias processor 505. In some embodiments the direction bias processor 505 comprises a T/F domain direction checker 701. The T/F domain direction checker 701 is configured to receive or obtain time-frequency domain directions 506 and the detected object directions 302. The T/F domain direction checker 701 is configured to determine or estimate an absolute angular difference between the T/F domain based directions and the object directions. This can be estimated for example by $$\theta_{ad}(k,n,i)=|\text{wrap}\{\theta_{ss}(i,n)-\theta_{pd}(k,n)\}|,$$

where |·| denotes taking the absolute value, and wrap{ } denotes wrapping the angle values between −180 and +180 degrees. This example assumes only horizontal directions for simplicity but can be straightforwardly extended to having also elevations, for example in this case the formulation of the angular difference with also elevation can be performed using dot product of unit vectors towards the two directions and an arccosine operation.

The T/F domain direction checker 701 can then be configured to select the smallest of the differences, which may be expressed as:

$$\theta_{ad,min}(k,n)=\min/i\ \theta_{ad}(k,n,i)$$

Furthermore the T/F domain direction checker 701 can be configured to select the corresponding signed value $\theta_{sd,min}(k, n)$ in other words information whether the difference is positive or negative.

The T/F domain direction checker 701 furthermore is configured to check whether $\theta_{ad,min}(k, n)$ is smaller than a threshold value $\theta_T$, for example $\theta_T=30$ degrees.

Where the direction checker 701 determines the smallest of the differences is larger than the threshold value then the directions can be passed to a direction bypass 705.

The direction bias processor 505 in some embodiments comprises a direction bypass 705 which passes the preliminary time-frequency domain directions unmodified to the output $\theta(k,n)=\theta_{pd}(k,n)$, when $\theta_{ad,min}(k,n) \geq \theta_T$ It would be understood that the direction bypass 705 is optional (in other words that the direction checker 701 is configured to output the directions unmodified without a direction bypass 705). In some embodiments the direction bypass 705 is a buffer configured to store the unmodified directions while some other directions are modified by the closest object direction biaser 703.

In some embodiments the direction bias processor 505 comprises a closest object direction biaser 703. In some embodiments the closest object direction biaser 703 is configured to determine or generate a bias direction modifier based on the signed value $\theta_{sd,min}(k, n)$ and the threshold value $\theta_T$. For example the closest object direction biaser 703 is configured to determine a bias direction modifier value based on the following:

$$\theta_{bias}(k, n) = \begin{cases} \theta_{sd,min}(k, n), & \text{when } |\theta_{sd,min}(k, n)| \leq \frac{\theta_T}{2} \\ \theta_T - \theta_{sd,min}(k, n), & \text{when } \theta_{sd,min}(k, n) > \frac{\theta_T}{2} \\ -\theta_T - \theta_{sd,min}(k, n), & \text{when } \theta_{sd,min}(k, n) < -\frac{\theta_T}{2} \end{cases}$$

This bias direction modifier value provides an amount that biases the direction parameter exactly to the nearest object direction when $\theta_{ad,min}(k, n) \leq \frac{\theta_T}{2}$, and interpolates when $\theta_{ad,min}(k, n) > \frac{\theta_T}{2}$.

In some embodiments other equations for determining the bias direction modifier values can be formulated. The embodiments thus bias the preliminary time-frequency directions towards the nearest object direction if the absolute angular difference is below the threshold.

The closest object direction biaser 703 can then use the computed bias direction modifier values to generate the output time-frequency domain directions, for example by the following:

$\theta(k,n)=\theta_{pd}(k,n)+\theta_{bias}(k,n)$, when $\theta_{ad,min}(k,n)<\theta_T$.

The biased directions can then be output with the unmodified time-frequency domain directions as a time-frequency domain directions 508.

In the example above the spatial analysis thus is configured to provide multiple direction estimates or parametric based direction of arrival estimates. It may be in some circumstances some of these parametric based estimates point to reflections instead of the actual direction of the sound source. However the aim of these embodiments is to enable the listener to perceive the sound from the actual direction of the sound source in general. Thus as described another estimate (the broadband estimate) of the sound source direction is obtained and the parametric based (based on the time-frequency audio signals) directions are modified or biased based on the further estimates. This other estimate should relatively reliably point to the actual main direction of the sound source. This is then extended to multiple known sound source directions and the bias direction is selected from those using smallest angular difference.

In some circumstances where there are two sound sources (A and B) present in a room (or environment generally) and with clearly different directions from the listener's point of view. In this case, it may be that A and B are active at the same time and for example the parametric directional estimates of some of the reflections of A could come from near the direction of B. This may result in that part of the reflections of A would probably be biased towards B. However, perceptually this may not be a significant problem as reflections are not really perceived separately (as sources) in normal rooms and a slight mismatch in their direction after biasing should not be critical. As discussed earlier, the directional estimates may deviate from the directions of the actual sources for other reasons than due to reflections, for example, due to noise at the microphones (e.g. wind, handling), acoustic effect of the user's hand near the microphones, background ambience, and reverberation.

The smallest angular difference selection furthermore is only an example and there may be other selection criteria.

Figure 8:
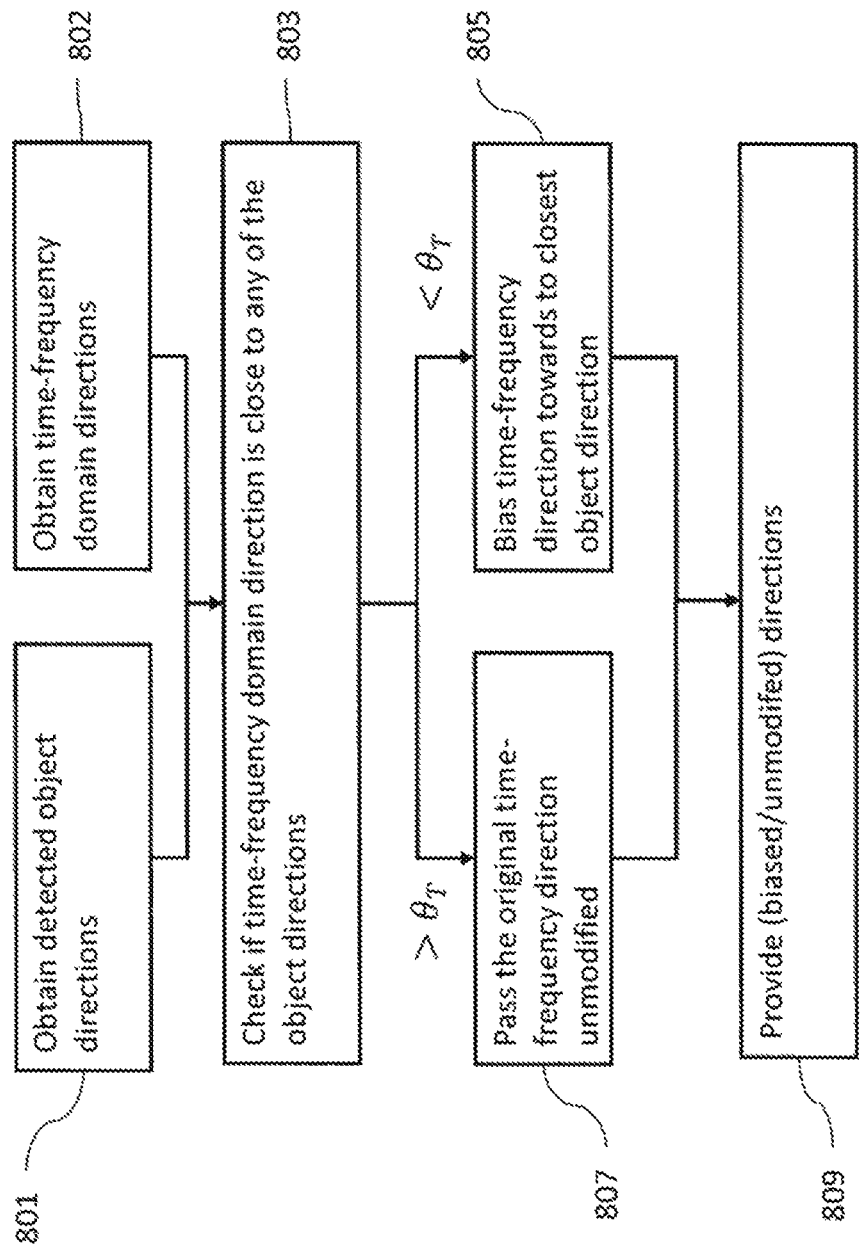
FIG. 8 shows a flow diagram of the operation of the example direction bias processor shown in FIG. 7 according to some embodiments.

With respect to FIG. 8 a flow diagram showing the operation of the direction bias processor as shown in FIG. 7.

The detected object directions are obtained or otherwise received as shown in FIG. 8 by step 801.

Furthermore the time-frequency domain audio signal based directions are received or otherwise obtained as shown in FIG. 8 by step 802.

Having obtained the time-frequency domain audio signal based directions and detected object directions the next operation is determining whether the time-frequency domain audio signal based direction is close to any of the object directions as shown in FIG. 8 by step 803.

Where the difference between the time-frequency domain audio signal based direction and any of the object directions is greater than the threshold value then the time-frequency domain audio signal based direction is then passed unmodified as shown in FIG. 8 by step 807.

Where the difference between the time-frequency domain audio signal based direction and any of the object directions is less than the threshold value then the time-frequency domain audio signal based direction is then biased towards the closest object direction as shown in FIG. 8 by step 805.

The biased and/or unmodified directions can then be provided as shown in FIG. 8 by step 809.

Figure 9:
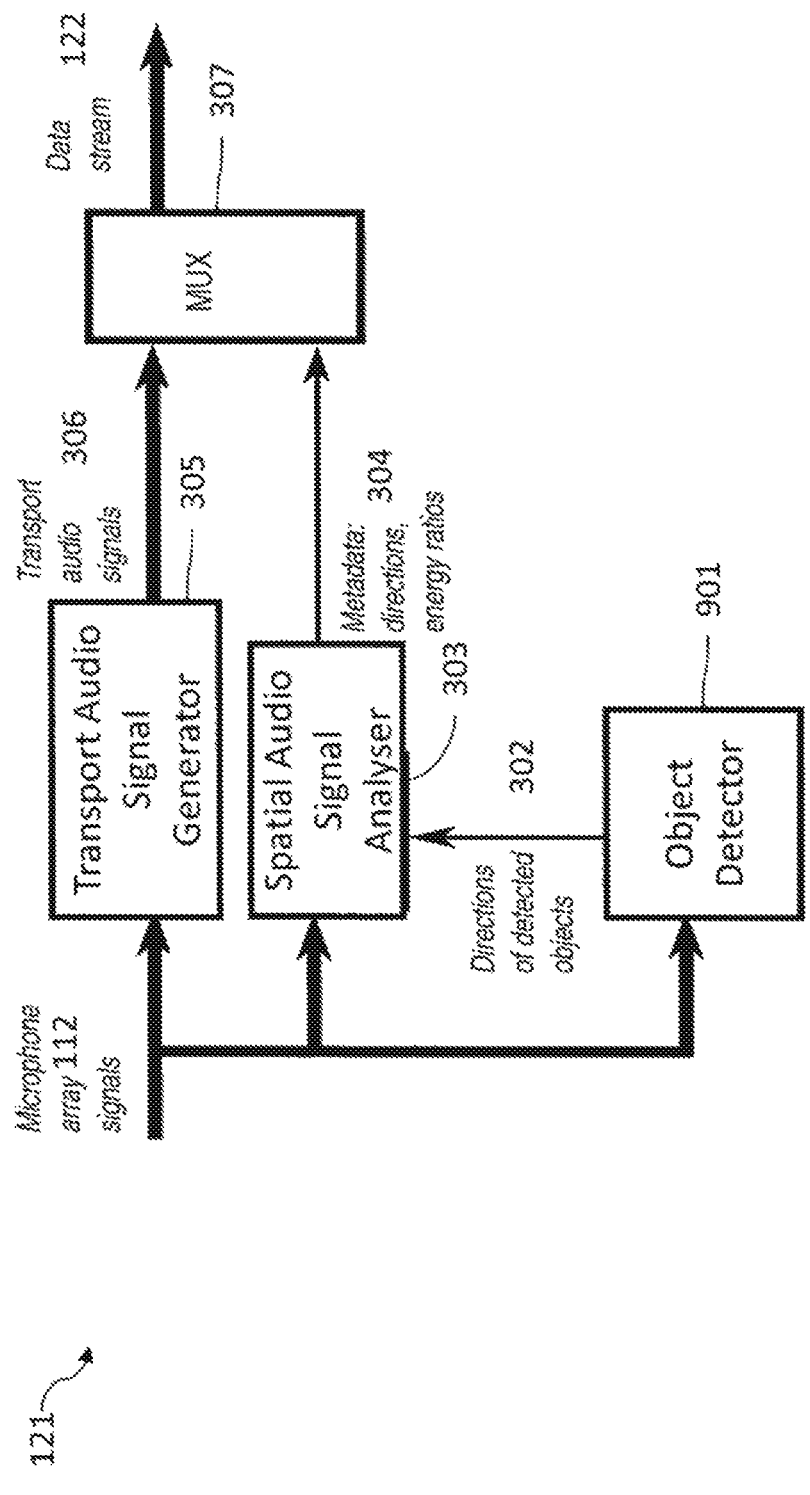
FIG. 9 shows schematically a further example analysis processor as shown in FIG. 1 according to some embodiments.

With respect to FIG. 9 a further example analysis processor 121 is shown. In this example the analysis processor uses only the microphone array audio signals as an input.

In this example analysis processor 121 the object detector 901 is configured to receive the microphone array signals instead of the video stream or image data. The object detector 901 can be configured to determine sound source or object directions based on the microphone array audio signals. For example in some embodiments the object detector 901 is configured to implement object detection based on a suitable audio detection algorithm such as described in "Real-Time Multiple Sound Source Localization and Counting Using a Circular Microphone Array", Despoina Pavlidi, Anthony Griffin, Matthieu Puigt, Athanasios Mouchtaris, IEEE Transactions on Audio, Speech, and Language Processing, 2013. The output of the object detector 901 is the directions of the detected sound sources $\theta_{ss}(i, n)$.

The remainder of the operations of the analysis processor 121 can be the same as those as described above.

Figure 10:
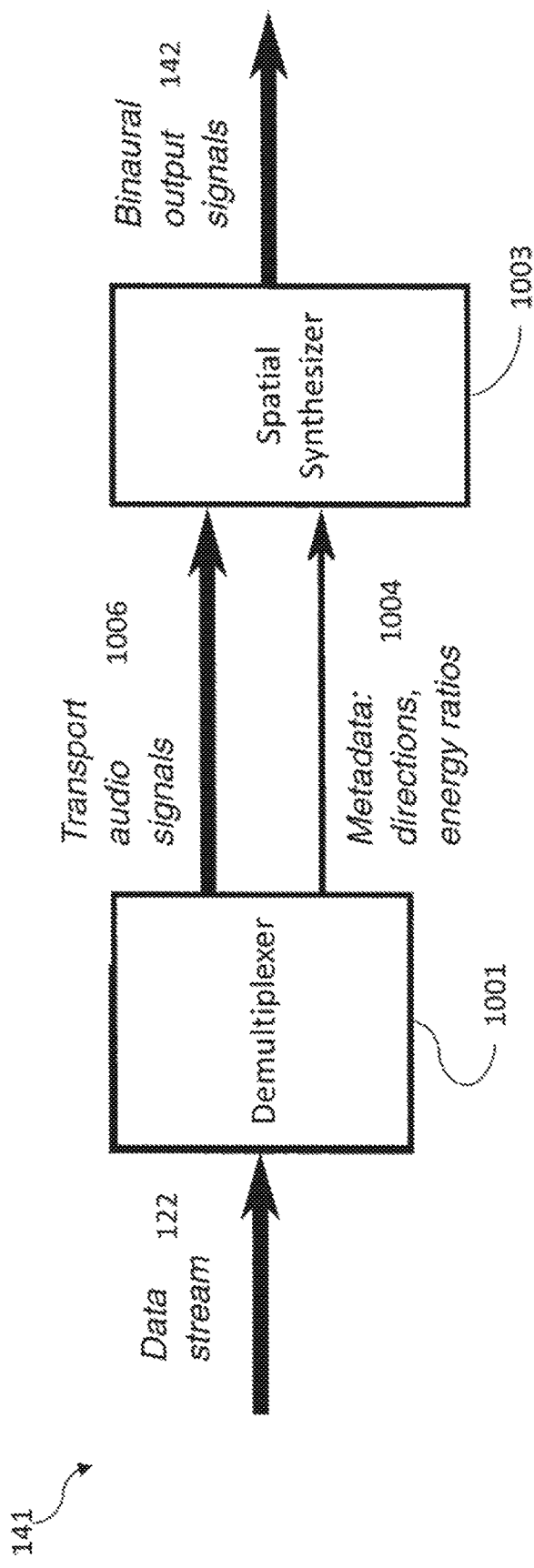
FIG. 10 shows schematically an example synthesis processor as shown in FIG. 1 according to some embodiments.

With respect to FIG. 10 is shown an example synthesis processor 141 as shown in FIG. 1.

In some embodiments the synthesis processor 141 comprises a demultiplexer or DEMUX 1001. The demultiplexer 1001 is configured to receive the data stream 122 and demultiplex and decode the input to generate transport audio signals 1006 and metadata (in the form of directions and furthermore energy ratio parameters). The transport audio signals 1006 and the metadata 1004 can be provided to the spatial synthesizer 1003.

The synthesis processor 141 furthermore comprises a spatial synthesizer 1003. The spatial synthesizer 1003 is configured to receive the transport audio signals 1006 and metadata 1004 and generate a suitable output format audio signals, for example binaural output signals 142. The spatial synthesizer 1003 is configured to utilize the metadata to process the transport audio signals in such a way in frequency bands that a spatialized output such as a binaural signal is generated. In some embodiments other output spatial audio signal formats that can be generated may be Ambisonic signals, stereo or surround loudspeaker signals. In some embodiments, such as 360-video playback, the user's head movements may be tracked, and in that case the spatial synthesizer is configured to receive and process the transport audio signals based on the headtracking information input.

The operation of the spatial synthesizer is well known and is not described in further detail.

Figure 11:
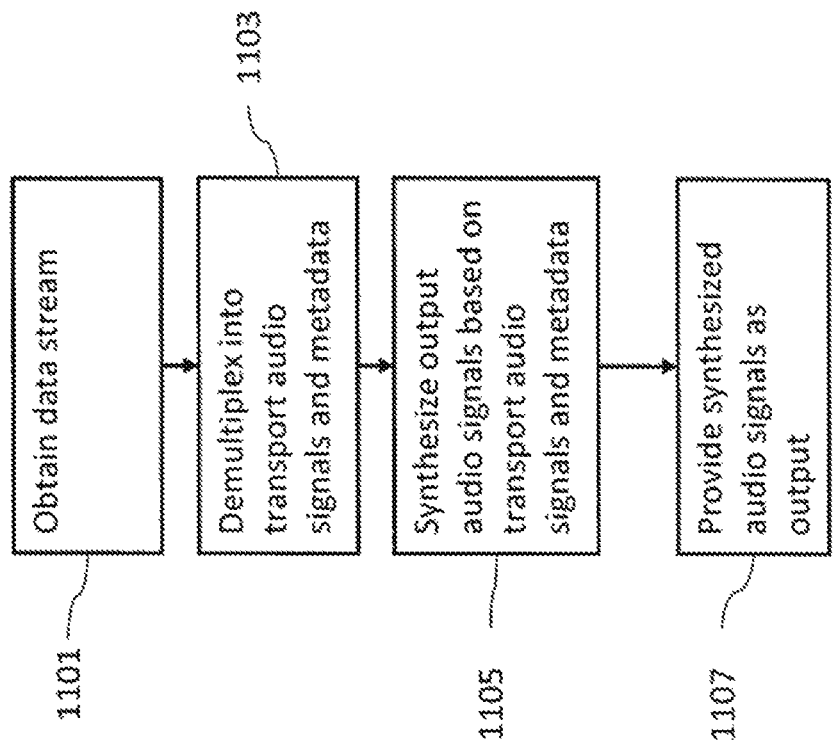
FIG. 11 shows a flow diagram of the operation of the example synthesis processor shown in FIG. 10 according to some embodiments.

With respect to FIG. 11 is shown a flow diagram of the operation of the synthesis processor 141 as shown in FIG. 10.

The data stream comprising the transport audio signals and metadata where the metadata comprises directions (biased and/or unmodified) and ratios is obtained as shown in FIG. 11 by step 1101.

Having obtained the data stream, the data stream is demultiplexed into transport audio signals and metadata as shown in FIG. 11 by step 1103.

Having obtained the transport audio signals and metadata then output audio signals are generated based on the transport audio signals and metadata as shown in FIG. 11 by step 1105.

The generated output audio signals can then be provided as the synthesized audio signals as shown in FIG. 11 by step 1107.

In some embodiments the object detector is configured to receive or obtain information other than a video stream or microphone array signals to generate the directions of detected objects. For example, the object detection operations may be affected by a user input. In some embodiments a user could select an object of interest which is displayed on a touch screen of a camera phone. The phone (or any device with the microphones in alternative embodiments) may also be equipped with any other sensors to provide information to the object detector to generate the directions of the detected objects.

In some embodiments the energy ratio parameter can be a direct-to-total energy ratio, an ambient-to-total energy ratio (diffuseness), a directional stability parameter, or any other suitable ratio. The ratio is configured to indicate how directional or non-directional the sound is for a frequency band.

In some embodiments the broadband sound source direction estimate(s) can be obtained from metadata associated with audio objects known to be captured in the microphone-array signals. In such embodiments an audio scene is captured with a microphone array and closeup signals for objects, and metadata is then provided for the object signals.

In some further embodiments where the object detection is performed on an audio signal (separate audio object, e.g., close mic, or spatial audio capture), the object detection can be implemented such that the analysis is performed to determine the frequency bands where each object is 'located'. In some embodiments this can be implemented, for example, by estimating the energy for each frequency band and then comparing it to a threshold value. If the frequency band energy is above the threshold, the object can be determined to be 'located' within the frequency band (or the frequency band is active) and used for biasing. If the frequency band energy is below the threshold (or has a low energy) then the object is not 'located' within the frequency band (or the frequency band is not active) and should not be used for biasing as it would bias to an incorrect direction.

Additionally in some embodiments as well as indicating whether an object is located within a frequency band (the frequency band is active), the object detector can be configured to indicate whether the object is 'located' within a time frame (or whether the time frame is active) and use that information to decide whether the biasing should be performed or not. In some embodiments a visual analysis means can provide information whether a sound source is active, for example, by detecting the mouth movement of a speaker, with a mouth open or in movement (and therefore likely indicating activity) or closed mouth indicating that the talker is not speaking. When object detection is performed based on audio signals, this time frame detection can be implemented by determining whether the time frame audio signal has an energy above a predetermined silence threshold.

In some embodiments the object detector is configured to provide additional metadata for the detected sound sources. For example, if the broadband direction estimate(s) are obtained with a method that offers any confidence information of the direction, this confidence information can be passed to the biasing and be used to affect the biasing process. Such confidence information may, for example, be obtained by detecting whether a speaker is moving his/her mouth, which corresponds to a high likelihood of the person speaking. The confidence information may, for example, be utilized by scaling the threshold value so that confident sound source direction estimates bias the directions more strongly and from further away than unconfident estimates.

In some further embodiments multiple sources (e.g., video+audio+radio) of broadband direction estimates can be used together to form a single more accurate broadband direction estimate that can be used in biasing.

In further embodiments, the bias processing can be performed to metadata-assisted spatial audio (MASA) format (or similar N channels+metadata format that can be the output of the spatial analysis). In these embodiments, the metadata is modified after the analysis by biasing the direction values. This process can be performed, for example, to a stored MASA-format file, within transmission of the format by decoding and encoding the metadata, or in synthesis before the direction metadata values are used (or during the process of using them). This may be implemented if the broadband estimates are available to the process. For transmission, this means also transmitting the broadband estimates to the receiving end unless the estimate is provided by the receiving end which allows the receiving user to define the bias direction.

The bias processing can be implemented at various stages of the processing: in the capture algorithm, in the encoder, in the transmission system, in the transmission mixer, in the decoder, or in the spatial sound renderer. The biasing processing can be thought as an independent processing block, it can be placed anywhere in the processing chain to enhance the direction metadata.

In some further embodiments, the bias processing can be enabled/disabled by the user. For example, in the example where the processing is applied for a MASA format, the typical use case for the format can be mobile telephony in future telecommunication networks such as 5G or 6G. In these scenarios, speech intelligibility is the most important criterion for the quality of the spatial audio signal. Thus, the user may wish to enable the biasing manually if it is not enabled by default. In other embodiments, the biasing can be enabled by the system automatically based on the use scenario of the parametric spatial audio: if the spatial audio signal is used for telecommunication purposes (telephony) then the biasing can be automatically enabled by the system. If the spatial audio signal is used for other purposes, such as the sound track for a user created video, the system can provide the user the option to enabled/disable the bias function.

In some embodiments not all sources/objects need to have broadband direction estimates. Thus in some embodiments a subset of the sources/objects have broadband estimates. For example, the invention enables biasing only the most important sources, for example, the most prominent talkers.

It is also noted that although the term broadband direction estimate has been used for describing the estimated direction of the objects/sound source(s), it may in some embodiments and/or cases be used for certain frequencies, instead of broadband. For example it may be known that a certain sound source has energy only at certain frequencies and in that case it is useful to apply the biasing only at those frequencies.

The implementation of these embodiments as described above may have advantages such as increasing an accuracy of important sources. Furthermore in the application of some embodiments may make sources more stable and point-like as they are biased towards known sources. This is especially evident on devices that otherwise tend to have spurious direction parameters (e.g., mobile capture analysis). Additional advantages may be the avoidance of alteration of other spatial characteristics (e.g., spaciousness and envelopment are preserved). There may further be an increase in speech intelligibility.

With respect to determining the at least one direction parameter of at least one propagating sound associated with the at least one audio signal we primarily refer to spatial audio captured with microphones. However it would be understood that some embodiments may be implemented in other contexts for example MASA. Furthermore with respect to determining at least one direction of at least one sound source associated with the at least one audio signal the "at least one audio signal" is capturing the audio signal of the sound source. In other words the idea is that this direction is linked to some sound source in the space where the microphone is capturing the 'at least one signal'. However, the sound source may not be active all the time. So, e.g., if we analyse the direction using the microphone signals, the sound source direction is in a practical implementation an average over time. So, it is pointing towards the source basically 'all' the time, even though he/she would not be saying anything, or at least during short breaks. Furthermore if the sound source detection algorithm is based, e.g., on video, it may detect faces of humans. Optimally, it should detect when lips are moving or some other indication the source is 'active', so that the source would actually be also speaking when the source is being detected. In some embodiments the apparatus could be configured to detect the faces as "potential" sound sources (and to accept that it sometimes makes errors). In other words, there may be, at least temporarily, a sound source that does not make any sound.

In such embodiments as discussed above the estimates are where the apparatus 'thinks' that the sound sources actually are. They do not necessarily therefore produce audio signals all the time.

The 'aim' of this direction parameter is to point to a sound source which actually makes sound. If it does not produce any sound at some point (being captured by the at least one audio signal), it is more of an 'estimation error'. Furthermore with respect to determining at least one direction of at least one sound source associated with the at least one audio signal, the methods described herein utilize data from different sensors (camera, microphone, IR, or other). Therefore, a practical device or its sensors may have, for example, small calibration issues or non-idealities which may result in that the sensed at least one direction of at least one sound source is not pointing exactly towards an actual sound source at the sound scene, but for example can be 1-5 degrees offset due to the calibration (or other) issue. Even in such cases, however, the embodiments as discussed herein can attempt to stabilize the directional estimates related to that source, and improves the perceived quality of the spatial audio reproduction. In other words, the at least one direction of at least one sound source may relate more to the best-effort estimate of the sound source direction rather than the actual sound source direction.

Figure 12:
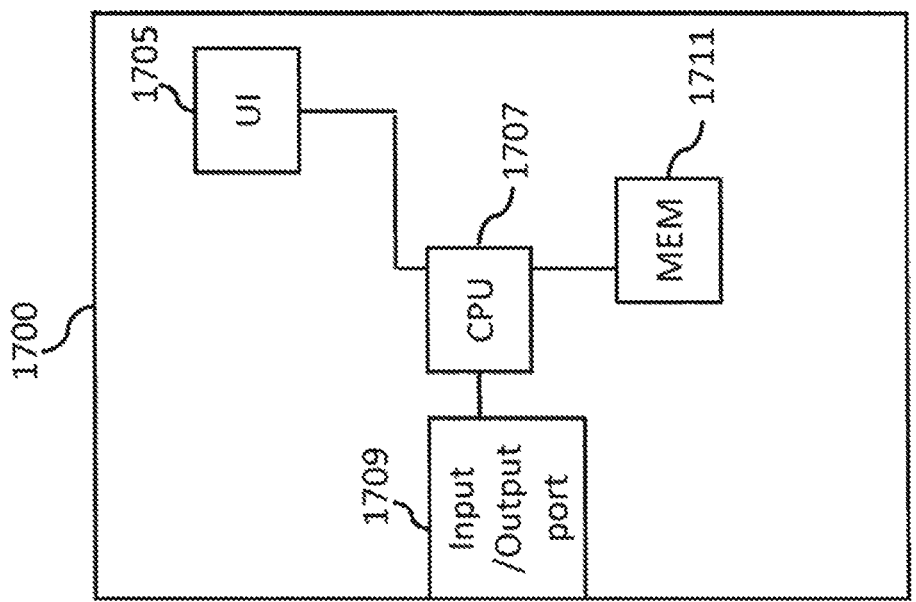
FIG. 12 shows an example device suitable for implementing the apparatus shown.

With respect to FIG. 12 an example electronic device which may be used as the analysis or synthesis device is shown. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating with the position determiner as described herein.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals and in some embodiments determine the parameters as described herein by using the processor 1707 executing suitable code. Furthermore the device may generate a suitable transport signal and parameter output to be transmitted to the synthesis device.

In some embodiments the device 1700 may be employed as at least part of the synthesis device. As such the input/output port 1709 may be configured to receive the transport signals and in some embodiments the parameters determined at the capture device or processing device as described herein, and generate a suitable audio signal format output by using the processor 1707 executing suitable code. The input/output port 1709 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including a computer program code, the at least one memory and the computer program code configured to, with the at least one processor, cause the apparatus at least to:
  obtain at least two audio signals;
  determine at least one direction of arrival parameter associated with at least one sound source of a sound field based on the at least two audio signals, wherein the at least one direction of arrival parameter at least in part represents a spatial impression of the at least one sound source within the sound field;
  determine at least one direction of the at least one sound source of the sound field based on the at least two audio signals;

modify the at least one direction of arrival parameter in accordance with the determined at least one direction; and output the modified at least one direction of arrival parameter.

2. The apparatus as claimed in claim 1, wherein the apparatus being caused to obtain at least two audio signals comprises the apparatus being caused to obtain at least one of:
- at least two microphone audio signals;
- at least one ambisonic audio signal; and
- at least one spatial audio signal, wherein the at least one spatial audio signal is associated with at least one metadata parameter, wherein the at least one metadata parameter comprises at least one of: a direction or direction-of-arrival; an energy ratio; or a diffuseness ratio.

3. The apparatus as claimed in claim 1, wherein the apparatus being caused to determine at least one direction of arrival parameter comprises the apparatus being caused to determine at least one of:
- at least one direction of arrival parameter of at least one propagating sound;
- at least one direction of arrival parameter of at least one audio source;
- at least one direction of arrival parameter of at least one reflection from at least one audio source; and
- at least one energy ratio parameter associated with the at least one direction of arrival parameter.

4. The apparatus as claimed in claim 1, wherein the apparatus being caused to determine at least one direction of arrival parameter comprises the apparatus being caused to determine the at least one direction of arrival parameter associated with at least one frequency band of the at least two audio signals.

5. The apparatus as claimed in claim 1, wherein the at least one sound source of the sound field comprises at least one of:
- a direct sound associated with at least one audio source within a space;
- a reflected sound associated with at least one audio source within a space;
- a sound associated with at least one virtual source;
- a reverberation sound;
- an ambient sound; and
- a superposition of any of the direct sound, reflected sound, reverberation sound and ambient sound.

6. The apparatus as claimed in claim 1, wherein the at least one sound source of the sound field is relative to a recording position from which the at least two audio signals is captured.

7. The apparatus as claimed in claim 1 wherein the apparatus being caused to determine the at least one direction of at least one sound source comprises the apparatus being caused to at least one of:
- analyze at least one signal from at least one infra-red sensor to determine the at least one direction of at least one sound source;
- analyze at least one signal from at least one sensor to determine the at least one direction of at least one sound source;
- obtain at least one user-input signal identifying the at least one direction of at least one sound source;
- obtain at least one positioning signal associated with an object, from which the at least one direction of at least one sound source is determined;
- analyze the at least two audio signals, when the at least two audio signals comprise two or more microphone audio signals; and
- obtain metadata associated with the at least two audio signals, the metadata comprising directional or location information, from which the at least one direction of the at least one sound source is determined when the at least one direction of arrival parameter is determined from an analysis of the at least two audio signals.

8. The apparatus as claimed in claim 1, wherein the apparatus being caused to modify the at least one direction of arrival parameter causes the apparatus to:
- determine an angular difference between the at least one direction of arrival parameter and the at least one direction of the at least one sound source; and
- compare the angular difference against a threshold value, wherein where the angular difference is larger than the threshold value then the at least one direction of arrival parameter is passed unmodified but where the angular difference is smaller than the threshold value then the at least one direction of arrival parameter is modified towards the at least one direction of the at least one sound source.

9. The apparatus as claimed in claim 8, wherein the apparatus being caused to modify the at least one direction of arrival parameter towards the at least one direction of the at least one sound source comprises the apparatus being caused to modify the at least one direction of arrival parameter to be at the at least one direction of the at least one sound source when the angular difference is less than a determined smaller threshold value and apply an interpolated modification to the at least one direction of arrival parameter when the angular difference is more than the determined smaller threshold value but less than the threshold value.

10. The apparatus as claimed in claim 1, wherein the apparatus is further caused to at least one of:
- determine at least one transport audio signal based on the at least two audio signals; and output the at least one transport audio signal with the modified at least one direction of arrival parameter; or
- analyze the at least two audio signals, when the at least two audio signals comprise at least two microphone audio signals, to determine at least one metadata parameter, wherein the at least one metadata parameter comprises at least one of: an energy ratio; and a diffuseness ratio; and
- output the at least one metadata parameter with the modified at least one direction of arrival parameter.

11. An apparatus comprising at least one processor and at least one memory including a computer program code, the at least one memory and the computer program code configured to, with the at least one processor, cause the apparatus at least to:
- obtain at least two transport audio signals;
- determine at least one direction of arrival parameter associated with at least one sound source of a sound field based on the at least two transport audio signals, wherein the at least one direction of arrival parameter at least in part represents a spatial impression of the at least one sound source within the sound field;
- determine at least one direction of the at least one sound source of the sound field based on the at least two transport audio signals;
- modify the at least one direction of arrival parameter in accordance with the determined at least one direction; and output the modified at least one direction of arrival parameter.

12. A method comprising:
obtaining at least two audio signals;
determining at least one direction of arrival parameter associated with at least one sound source of a sound field based on the at least two audio signals, wherein the at least one direction of arrival parameter at least in part represents a spatial impression of the at least one sound source within the sound field;
determining at least one direction of the at least one sound source of the sound field based on the at least two audio signals;
modifying the at least one direction of arrival parameter in accordance with the determined at least one direction; and
outputting the modified at least one direction of arrival parameter.

13. The method as claimed in claim 12, wherein determining the at least one direction of arrival parameter comprises determining the at least one direction of arrival parameter associated with at least one frequency band of the at least two audio signals.

14. The method as claimed in claim 12, further comprises at least one of:
determining at least one transport audio signal based on the at least two audio signals; and outputting the at least one transport audio signal with the modified at least one direction of arrival parameter; or
analysing the at least two audio signals, when the at least two audio signals comprise at least two microphone audio signals, to determine at least one metadata parameter, wherein the at least one metadata parameter comprises at least one of: an energy ratio; and a diffuseness ratio; and
outputting the at least one metadata parameter with the modified at least one direction of arrival parameter.

15. The method as claimed in claim 12, wherein determining the at least one direction of at least one sound source comprises at least one of:
analysing at least one signal from at least one infra-red sensor to determine the at least one direction of at least one sound source;
analysing at least one signal from at least one sensor to determine the at least one direction of at least one sound source;
obtaining at least one user-input signal identifying the at least one direction of at least one sound source;
obtaining at least one positioning signal associated with an object, from which the at least one direction of at least one sound source is determined;
analyzing the at least two audio signals, when the at least two audio signals comprise two or more microphone audio signals; and
obtaining metadata associated with the at least two audio signals, the metadata comprising directional or location information, from which the at least one direction of the at least one sound source is determined when the at least one direction of arrival parameter is determined from an analysis of the at least two audio signals.

16. The method as claimed in claim 12, wherein modifying the at least one direction of arrival parameter comprises at least one of:
determining an angular difference between the at least one direction of arrival parameter and the at least one direction of the at least one sound source; and
comparing the angular difference against a threshold value, wherein where the angular difference is larger than the threshold value then the at least one direction of arrival parameter is passed unmodified but where the angular difference is smaller than the threshold value then the at least one direction of arrival parameter is modified towards the at least one direction of the at least one sound source.

17. A method comprising:
obtaining at least two transport audio signals;
determining at least one direction of arrival parameter associated with at least one sound source of a sound field based on the at least two transport audio signals, wherein the at least one direction of arrival parameter at least in part represents a spatial impression of the at least one sound source within the sound field;
determining at least one direction of the at least one sound source of the sound field based on the at least two transport audio signals;
modifying the at least one direction of arrival parameter in accordance with the determined at least one direction; and
outputting the modified at least one direction of arrival parameter.

\* \* \* \* \*